United States Patent
Doy et al.

(10) Patent No.: US 11,578,737 B2
(45) Date of Patent: Feb. 14, 2023

(54) DISTANCE BASED ACTUATOR VELOCITY CALIBRATION SYSTEM

(71) Applicant: CATERPILLAR PAVING PRODUCTS INC., Brooklyn Park, MN (US)

(72) Inventors: Nathaniel S. Doy, Maple Grove, MN (US); Hyppolite Kuissi, Peoria, IL (US); Lee M. Hogan, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 246 days.

(21) Appl. No.: 16/816,810

(22) Filed: Mar. 12, 2020

(65) Prior Publication Data
US 2021/0285468 A1    Sep. 16, 2021

(51) Int. Cl.
*F15B 19/00*    (2006.01)
*E01C 23/088*    (2006.01)
(Continued)

(52) U.S. Cl.
CPC .............. *F15B 19/002* (2013.01); *B60G 3/01* (2013.01); *B60G 17/0165* (2013.01);
(Continued)

(58) Field of Classification Search
CPC .. F15B 19/002; F15B 2211/6336; B60G 3/01; B60G 17/0165; B60G 2300/09; B60G 2500/30; B60G 2300/32
See application file for complete search history.

(56) References Cited

U.S. PATENT DOCUMENTS

| 3,802,525 A | 4/1974 | Snow, Jr. |
| 4,139,318 A | 2/1979 | Jakob |

(Continued)

FOREIGN PATENT DOCUMENTS

| KR | 950001048 B1 | 2/1995 |
| WO | 2002057112 A1 | 7/2002 |
| WO | 2020135921 A1 | 7/2020 |

OTHER PUBLICATIONS

U.S. Patent Application of Nathaniel S. Doy et al., entitled "Relative Velocity Based Actuator Velocity Calibration System," filed Mar. 12, 2020.
(Continued)

*Primary Examiner* — Dustin T Nguyen
(74) *Attorney, Agent, or Firm* — Finnegan, Henderson, Farabow, Garrett & Dunner, LLP

(57) ABSTRACT

A milling machine may have a frame, ground engaging tracks that support the frame, and an actuator that adjusts a height of the frame relative to the track. The milling machine may have a control valve that selectively controls a flow of fluid into or out of the actuator based on the current supplied to the control valve. The milling machine may have a controller that determines the amount of current required to operate the actuator at a nominal actuator velocity and supplies that current to the control valve. The controller determines a measured actuator velocity based on a time required to extend or retract the actuator by a predetermined length, and adjusts the amount of current based on the measured and nominal actuator velocities. The controller also supplies the adjusted amount of current to the control valve to adjust the height of the frame relative to the track.

16 Claims, 10 Drawing Sheets

(51) Int. Cl.
*B60G 3/01* (2006.01)
*B60G 17/0165* (2006.01)

(52) U.S. Cl.
CPC ........ *E01C 23/088* (2013.01); *B60G 2300/09* (2013.01); *B60G 2300/32* (2013.01); *B60G 2500/30* (2013.01); *F15B 2211/327* (2013.01); *F15B 2211/634* (2013.01); *F15B 2211/6336* (2013.01)

(56) References Cited

U.S. PATENT DOCUMENTS

| | | | |
|---|---|---|---|
| 4,186,968 A | 2/1980 | Barton | |
| 4,325,580 A | 4/1982 | Swisher, Jr. | |
| 4,456,863 A * | 6/1984 | Matusek | G05B 19/251 |
| | | | 318/632 |
| 4,678,236 A | 7/1987 | Wirtgen | |
| 4,943,119 A | 7/1990 | Zarniko | |
| 5,092,659 A | 3/1992 | Grathoff | |
| 5,189,940 A | 3/1993 | Hosseini | |
| 5,308,219 A * | 5/1994 | Lee | G05B 19/042 |
| | | | 414/695.5 |
| 5,309,407 A | 5/1994 | Sehr | |
| 5,318,378 A | 6/1994 | Lent | |
| 5,378,081 A | 1/1995 | Swisher, Jr. | |
| 5,467,541 A | 11/1995 | Greer | |
| 5,588,776 A | 12/1996 | Swisher, Jr. | |
| 5,607,205 A | 3/1997 | Burdick | |
| 5,623,093 A * | 4/1997 | Schenkel | F15B 19/002 |
| | | | 73/1.01 |
| 5,784,945 A * | 7/1998 | Krone | F15B 19/00 |
| | | | 91/361 |
| 5,893,677 A | 4/1999 | Haehn | |
| 5,984,420 A | 11/1999 | Murray | |
| 6,152,648 A | 11/2000 | Gfroerer | |
| 6,234,061 B1 | 5/2001 | Glasson | |
| 6,282,891 B1 | 9/2001 | Rockwood | |
| 6,450,048 B1 | 9/2002 | Samuelson | |
| 6,769,836 B2 | 8/2004 | Lloyd | |
| 6,775,974 B2 * | 8/2004 | Tabor | F15B 9/09 |
| | | | 91/435 |
| 6,923,508 B2 | 8/2005 | Holl | |
| 7,946,788 B2 | 5/2011 | Jurasz | |
| 7,997,117 B2 * | 8/2011 | Zhang | G01F 15/005 |
| | | | 73/1.79 |
| 8,061,180 B2 * | 11/2011 | Green | F15B 19/002 |
| | | | 73/1.72 |
| 8,113,592 B2 * | 2/2012 | Busley | B60G 17/015 |
| | | | 404/90 |
| 8,128,177 B2 | 3/2012 | Menzenbach | |
| 8,246,270 B2 | 8/2012 | Berning | |
| 8,308,395 B2 | 11/2012 | Jurasz | |
| 8,511,932 B2 | 8/2013 | Jurasz | |
| 8,690,474 B2 | 4/2014 | Jurasz | |
| 8,718,880 B2 * | 5/2014 | Cadman | E02F 9/2025 |
| | | | 701/50 |
| 8,807,867 B2 | 8/2014 | Berning | |
| 8,814,133 B2 | 8/2014 | Li et al. | |
| 9,010,871 B2 | 4/2015 | Busley | |
| 9,523,176 B2 | 12/2016 | Berning | |
| 9,656,530 B2 | 5/2017 | Busley | |
| 9,879,390 B2 | 1/2018 | Berning | |
| 9,879,391 B2 | 1/2018 | Berning | |
| 10,266,996 B2 | 4/2019 | Hogan | |
| 10,358,799 B2 * | 7/2019 | Fujii | E02F 9/2228 |
| 10,481,033 B2 | 11/2019 | Joshi et al. | |
| 11,255,059 B2 * | 2/2022 | Engelmann | E01C 23/088 |
| 2002/0100649 A1 | 8/2002 | Agrotis | |
| 2006/0024134 A1 | 2/2006 | Rio | |
| 2007/0098494 A1 | 5/2007 | Mares | |
| 2008/0153402 A1 | 6/2008 | Arcona | |
| 2013/0166155 A1 | 6/2013 | Killion | |
| 2014/0326908 A1 * | 11/2014 | Schober | F15B 13/0444 |
| | | | 251/129.04 |
| 2014/0379227 A1 | 12/2014 | Reuter | |
| 2016/0076217 A1 | 3/2016 | Costello | |
| 2016/0186391 A1 | 6/2016 | Wachsmann | |
| 2016/0265174 A1 | 9/2016 | Engelmann et al. | |
| 2017/0100981 A1 | 4/2017 | Muir | |
| 2017/0362784 A1 | 12/2017 | Hoffmann | |
| 2018/0180068 A1 | 6/2018 | Fukuda | |
| 2022/0072922 A1 | 3/2022 | Ponstein | |

OTHER PUBLICATIONS

U.S. Appl. No. 16/774,280 of Eric S. Engelmann et al., entitled "Milling Machine Having a Fluid Flow Based Height Measurement System," filed Jan. 28, 2020.

\* cited by examiner

DISTANCE BASED ACTUATOR VELOCITY CALIBRATION SYSTEM

TECHNICAL FIELD

The present disclosure relates generally to an actuator velocity calibration system and, more particularly, to a distance based actuator velocity calibration system.

BACKGROUND

Road surfaces typically include an uppermost layer of asphalt or concrete on which vehicles travel. Over time, a road surface may wear out or may be damaged, for example, due to the formation of potholes or development of cracks and ruts. The damaged road surface may in turn cause damage to vehicles travelling on the road surface. The damaged road surface can be repaired locally by filling up the potholes, cracks, and/or ruts. However, it is often desirable to replace the worn or damaged road surface with an entirely new road surface. This is usually accomplished by removing a layer of the asphalt or concrete from the roadway and repaving the roadway by laying down a new layer of asphalt or concrete.

A milling machine is often used to remove the layer of asphalt or concrete on the roadway surface. A typical milling machine includes a frame supported on wheels or tracks by height adjustable leg columns and including a milling drum attached to the frame. As the milling machine is driven over the existing roadway surface, teeth or cutting tools on the rotating milling drum come into contact with the roadway surface and tear up a layer of the roadway. A milling drum chamber encloses the milling drum to contain the milled material. The milled material is transported using a conveyor system to an adjacent vehicle, which removes the material from the worksite. Following the milling process, a new layer of asphalt or concrete may be applied on the milled road surface to create a new roadway surface.

In another application, it is sometimes desirable to stabilize or reconstitute the upper layer of a roadway or a worksite. This is usually accomplished by removing the upper layer, mixing it with stabilizing components such as cement, ash, lime, etc., and depositing the mixture back on top of the roadway or worksite. A milling machine, such as a stabilizer or reclaimer is often used for this purpose. Such milling machines may also include a frame supported on tracks or wheels by height adjustable leg columns and including a milling drum attached to the frame. The milling drum is enclosed in a drum chamber. The cutting tools or teeth on the milling drum tear up the ground and push the removed material toward a rear of the drum chamber. Stabilizing ingredients and/or water are mixed with the milled material, which is then deposited back on to the ground towards the rear of the drum chamber.

In the machines discussed above, it is often necessary to position the frame at a desired height and/or orientation relative to the ground surface. It may also be necessary to maintain the machine's attitude (pitch and roll) when raising or lowering more than one leg of the machine simultaneously. Even though nearly identical control elements (e.g. control valves) may be used to control a flow of fluid into or out of the one or more actuators used to alter the frame height, in practice the control elements do not operate exactly in the same manner. For example, different control elements may be subject to different amounts of wear and tear or frictional forces and may operate differently even when provided with the same inputs. Thus, for example, for the same input current, nearly identical control valves on a machine may open by different amounts allowing different amounts of fluid to flow into or out of their respective actuators.

One way to overcome the above problems is by calibrating the control valves based on a simple "cracking current" calibration. For example, U.S. Pat. No. 8,718,880 of Cadman et al., issued on May 6, 2014 ("the '880 patent") discloses a method of calibrating electro-hydraulic valves on construction equipment. The '880 patent discloses using sensors, such as, pressure sensors to determine when flow of hydraulic fluid occurs through a control valve. The method of the '880 patent increases the current supplied to the control valve while monitoring the pressure sensors. A controller of the '880 patent determines the current at which hydraulic fluid first starts flowing through the control valve (i.e. "cracking current") based on signals received from the pressure sensors. The controller then adjusts the relationship between the current and fluid flow rate through the valve based on the determined cracking current.

Although the '880 patent discloses a method of calibrating control valves based on the cracking current, such a calibration system may still be less than optimal. In particular, such a method requires placement of pressure sensors in the correct locations, for example, adjacent to the control valves. Such placement of pressure sensors may not be practical in actual construction machines. Furthermore, the disclosed calibration method of the '880 patent assumes that the designed value of cracking current is the same for every valve and further that the current to flow rate relationship is identical for identical control valves regardless of variations in manufacturing and/or installation. Thus, there is a need for a more reliable method and system of calibrating the control elements associated with actuators used to move one or more implements on construction machines.

The disclosed distance based actuator velocity calibration system of the present disclosure solves one or more of the problems set forth above and/or other problems of the prior art.

SUMMARY

In one aspect, the present disclosure is directed to a milling machine. The milling machine may include a frame and a plurality of ground engaging tracks configured to support the frame. The milling machine may include an actuator connecting the frame to a track from the plurality of ground engaging tracks. The actuator may be configured to adjust a height of the frame relative to a ground surface. The milling machine may include a control valve configured to selectively control a flow of fluid into or out of the actuator based on an amount of current supplied to the control valve. The milling machine may also include a controller. The controller may be configured to determine the amount of current required to extend or retract the actuator at a nominal actuator velocity. The controller may also be configured to apply the determined amount of current to the control valve. Further, the controller may be configured to determine a measured actuator velocity based on a time required to extend or retract the actuator by a predetermined length. The controller may be configured to adjust the amount of current based on the measured actuator velocity and the nominal actuator velocity. In addition, the controller may be configured to apply the adjusted amount of current to the control valve to adjust the height of the frame relative to the ground surface.

In another aspect, the present disclosure is directed to a method of operating an actuator. The actuator may include a cylinder containing a fluid, a piston slidably disposed within the cylinder, and a rod having a first end connected to the piston. The actuator may also include a control valve configured to selectively control a flow of the fluid into or out of the cylinder based on an amount of current supplied to the control valve. The method may include determining, using a controller, an amount of current required to extend or retract the actuator at a nominal actuator velocity. The method may also include applying the determined amount of current to the control valve. The method may include determining, using the controller, a measured actuator velocity based on a time required to extend or retract the actuator by a predetermined length. Further, the method may include adjusting, using the controller, the amount of current based on the nominal actuator velocity and the measured actuator velocity. The method may also include applying, using the controller, the adjusted amount of current to the control valve to adjust a length of the actuator.

In yet another aspect, the present disclosure is directed to a milling machine. The milling machine may include a frame. The milling machine may also include a left front track disposed adjacent a front end of the frame, a right front track disposed adjacent the front end and spaced apart from the left front track, and at least one rear track disposed adjacent a rear end of the frame. Further, the milling machine may include a milling drum connected to the frame and disposed between the front end and the rear end. The milling machine may also include an engine configured to rotate the milling drum and propel the left front track, the right front track, and the at least one rear track in a forward or rearward direction. The milling machine may include height adjustable leg columns connecting the frame to the left front track, the right front track, and the at least one rear track. Each leg column may include an upper section connected to the frame, and a lower section slidably movable relative to the upper section and connected to one track of the left front track, the right front track, and the at least one rear track. Each leg column may also include a height adjustable hydraulic actuator connected at one end to the frame and at an opposite end to the one track. The milling machine may include a tank configured to store a fluid (e.g. hydraulic fluid) and a conduit connecting the tank to the hydraulic actuator. The milling machine may also include a control valve configured to selectively control a flow of the fluid in the conduit between the tank and the actuator based on an amount of current supplied to the control valve. Further, the milling machine may include a controller. The controller may be configured to determine the amount of current required to extend or retract the actuator at a nominal actuator velocity. The controller may also be configured to apply the determined amount of current to the control valve. Further, the controller may be configured to determine a measured actuator velocity based on a time required to extend or retract the actuator by a predetermined length. The controller may be configured to adjust the amount of current based on the measured actuator velocity and the nominal actuator velocity. In addition, the controller may be configured to apply the adjusted amount of current to the control valve to adjust the height of the frame.

DETAILED DESCRIPTION

Figure 1:
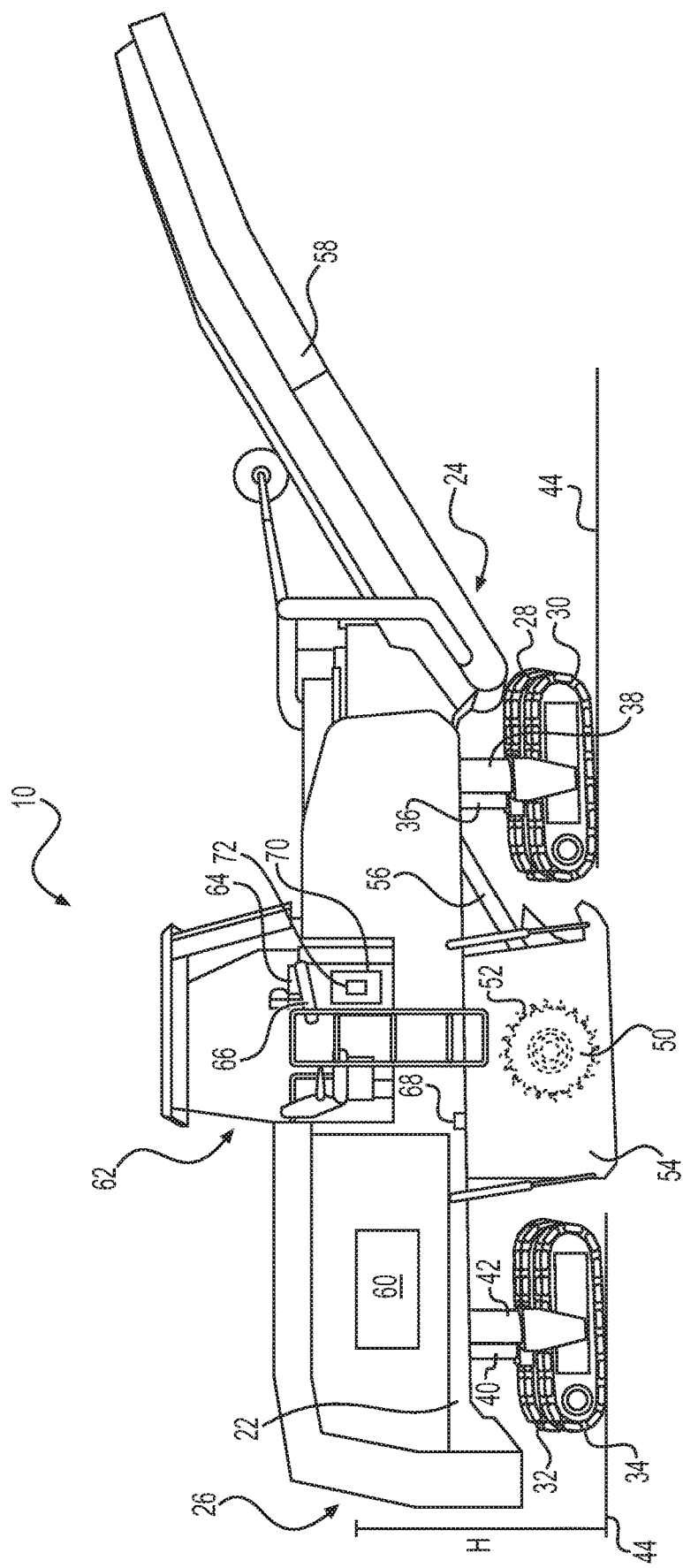
FIG. 1 is an illustration of an exemplary milling machine.
Figure 2:
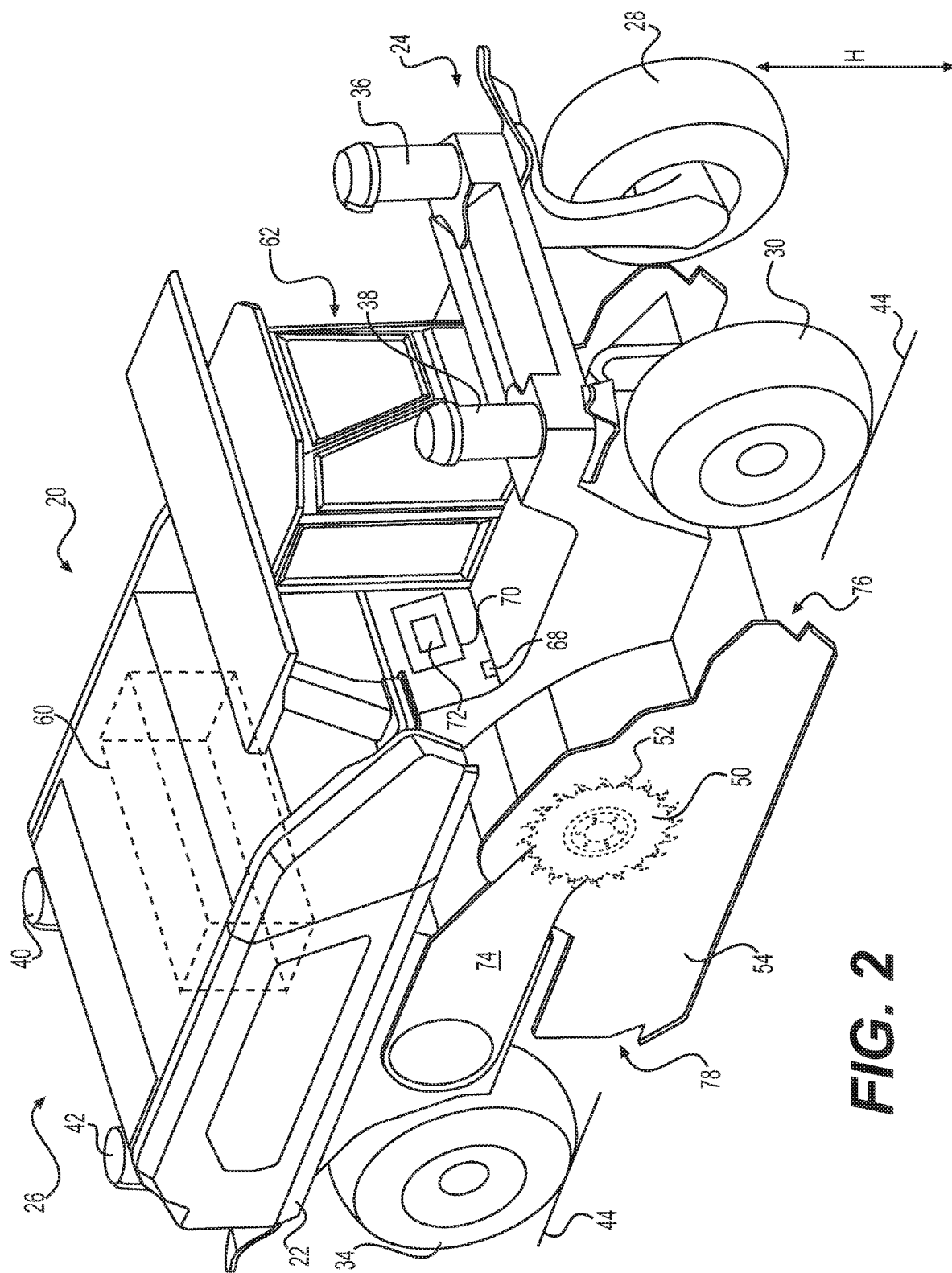
FIG. 2 is an illustration of another exemplary milling machine.

FIGS. 1 and 2 illustrate exemplary milling machines 10 and 20, respectively. In one exemplary embodiment as illustrated in FIG. 1, milling machine 10 may be a cold planer, which may also be referred to as a cold milling machine, a scarifier, a profiler, etc. Milling machine 10 may include frame 22, which may extend from first end 24 to second end 26 disposed opposite first end 24. In some exemplary embodiments, first end 24 may be a front end and second end 26 may be a rear end of frame 22. Frame 22 may have any shape (e.g. rectangular, triangular, square, etc.)

Frame 22 may be supported on one or more propulsion devices. For example, as illustrated in FIG. 1, frame 22 may be supported on propulsion devices 28, 30, 32, 34. Propulsion devices 28, 30, 32, 34 may be equipped with electric or hydraulic motors which may impart motion to propulsion devices 28, 30, 32, 34 to help propel machine 10 in a forward or rearward direction. Some or all of propulsion devices 28, 30, 32, 34 may also be steerable, allowing machine 10 to be turned towards the right or left during a forward or rearward motion on ground surface 44. In one exemplary embodiment as illustrated in FIG. 1, propulsion devices 28, 30, 32, 34 may take the form of tracks, which may include, for example, sprocket wheels, idler wheels, and/or one or more rollers that may support a continuous track. However, it is contemplated that propulsion devices 28, 30, 32, 34 of milling machine 10 may take the form of wheels (see FIG. 2.) In the present disclosure, the terms track and wheel will be used interchangeably and will include the other of the two terms.

Tracks 28, 30 may be located adjacent first end 24 of frame 22 and tracks 32, 34 may be located adjacent second end 26 of frame 22. Track 28 may be spaced apart from track 30 along a width direction of frame 22. Likewise, track 32 may be spaced apart from track 34 along a width direction of frame 22. In one exemplary embodiment as illustrated in FIG. 1, track 28 may be a left front track, track 30 may be a right front track, track 32 may be a left rear track, and track 34 may be a right rear track. Although milling machine 10 in FIG. 1 has been illustrated as including four tracks 28, 30, 32, 34, it is contemplated that in some exemplary embodiments, milling machine 10 may have only one rear track 32 or 34, which may be located generally centered along a width of frame 22.

Frame 22 may be connected to tracks 28, 30, 32, 34 by one or more leg columns 36, 38, 40, 42. For example, as illustrated in FIG. 1, frame 22 may be connected to left front track 28 via leg column 36 and to right front track 30 via leg column 38. Likewise, frame 22 may be connected to left rear track 32 via leg column 40 and to right rear track 34 via leg column 42. One or more of leg columns 36, 38, 40, 42 may be height adjustable such that a height of frame 22 relative to one or more of tracks 28, 30, 32, 34 may be increased or decreased by adjusting a length of one or more of leg columns 36, 38, 40, 42, respectively. It will be understood that adjusting a height of frame 22 relative to one or more of tracks 28, 30, 32, 34 would also adjust a height of frame 22 relative to ground surface 44 on which tracks 28, 30, 32, 34 may be supported.

Machine 10 may include milling drum 50, which may be attached to frame 22 between front end 24 and rear end 26. Milling drum 50 may include cutting tools 52 (or teeth 52) that may be configured to cut into and tear up a predetermined thickness of a roadway or the ground. A height of milling drum 50 relative to the ground surface 44 may be adjusted by adjusting a height of one or more leg columns 36, 38, 40, 42. As milling drum 50 rotates, teeth 52 of milling drum 50 may come into contact with the ground or roadway surface, thereby tearing up or cutting the ground or roadway surface. Milling drum 50 may be enclosed within drum chamber 54 which may help contain the material removed by teeth 52 from the ground or roadway surface. Machine 10 may include one or more conveyors 56, 58, which may help transport the material removed by milling drum 50 to an adjacent vehicle such as a dump truck.

Milling machine 10 may include engine 60, which may be attached to frame 22. Engine 60 may be any suitable type of internal combustion engine, such as a gasoline, diesel, natural gas, or hybrid-powers engine. It is contemplated, however, that in some exemplary embodiments, engine 60 may be driven by electrical power. Engine 60 may be configured to deliver rotational power output to one or more hydraulic motors associated with propulsion devices 28, 30, 32, 34, to milling drum 50, and to the one or more conveyors 56, 58. Engine 60 may also be configured to deliver power to operate one or more other components or accessory devices (e.g. pumps, fans, motors, generators, belt drives, transmission devices, etc.) associated with milling machine 10.

Milling machine 10 may include operator platform 62, which may be attached to frame 22. In some exemplary embodiments, operator platform 62 may be in the form of an open-air platform that may or may not include a canopy. In other exemplary embodiments, operator platform 62 may be in the form of a partially or fully enclosed cabin. As illustrated in FIG. 1, operator platform 62 may be located at a height "H" above ground surface 44. In some exemplary embodiments, height H may range between about 2 ft to 10 ft above ground surface 44. Operator platform 62 may include one or more controls 64, which may be used by an operator to operate and/or control milling machine 10. Control 64 may include one or more input devices 64, which may take the form of buttons, switches, sliders, levers, joysticks, wheels, touch screens, or other input/output or interface devices. Milling machine 10 may include display 66 located in operator platform 62. Display 66 may be configured to display information, data, and/or measurements obtained from one or more sensors of milling machine 10. Display 66 may also be configured to display diagnostic results, errors, and/or alerts. Display 66 may be a cathode ray tube (CRT) monitor, a liquid crystal display (LCD), a light emitting diode (LED) display, a touchscreen display, or any other kind of display.

Milling machine 10 may also include a variety of sensors configured to measure one or more operational parameters associated with milling machine 10. For example, milling machine 10 may include one or more orientation sensors 68. In one exemplary embodiment orientation sensor may be a slope sensor configured to determine an orientation of frame 22 relative to a reference surface, for example, ground surface 44. It is further contemplated that in some exemplary embodiments, orientation sensor 68 may be configured to determine an orientation of frame 22 (e.g. pitch angle or roll angle) relative to a direction of a gravitational force. For example, in some exemplary embodiments, orientation sensor 68 may generate signals indicative of a pitch angle indicating a slope of frame 22 relative to, for example, ground surface 44 along a forward-rearward direction of machine 10. Orientation sensor 68 may also generate signals indicative of a roll angle of frame 22 relative to, for example, ground surface 44 along a width direction of machine 10. In other exemplary embodiments, orientation sensor 68 may generate signals indicative of the pitch angle and roll angle relative to the direction of the gravitational force. It is also contemplated that separate orientation sensors 68 may be configured to determine the pitch angle and the roll angle, respectively. In other exemplary embodiments, a single orientation sensor 68 may generate signals indicative of both the pitch angle and the roll angle. For example, orientation sensor 68 may be an inertial sensor capable of determining both the pitch angle and the roll angle of frame 22. Orientation sensor 68 may be positioned anywhere on frame 22. It is also contemplated that orientation sensor 68 may be attached to other components of machine 10.

Milling machine controller 70, which may be configured to receive inputs, data, and/or signals from the one or more input devices 64, and or other sensors (e.g. orientation sensor 68) associated with milling machine 10 and to control the operation of one or more components (e.g. engine 60, milling drum 50, propulsion devices 28, 30, 32, 34, conveyors 56, 58, etc.) Controller 70 may include or be associated with one or more processors, memory devices 72, and/or communication devices. Controller 70 may embody a single microprocessor or multiple microprocessors, digital signal processors (DSPs), application-specific integrated circuit devices (ASICs), etc. Numerous commercially available microprocessors may be configured to perform the functions of controller 70. Various other known circuits may be associated with controller 70, including power supply circuits, signal-conditioning circuits, and communication circuits, etc. Controller 70 may also include one or more internal timers configured to monitor a time at which controller 70 may receive signals from one or more sensors or a time at which controller 70 may issue command signals to one or more components of milling machine 10.

The one or more memory devices 72 associated with controller 70 may store, for example, data and/or one or more control routines or instructions. The one or more memory devices 72 may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 70 may receive one or more input signals from the one or more input devices 64, and may execute the routines or instructions stored in the one or more memory devices 72 to generate and deliver one or more command signals to one or more of propulsion devices 28, 30, 32, 34, engine 60, milling drum 50, conveyors 56, 58, or other components of milling machine 10.

FIG. 2 illustrates another exemplary embodiment of a milling machine. In one exemplary embodiment as illustrated in FIG. 2, milling machine 20 may be a reclaimer, which may also be called soil stabilizer, reclaiming machine, road reclaimer, etc. Like milling machine 10, milling machine 20 may include frame 22, propulsion devices in the form of wheels 28, 30, 32 (not visible in FIG. 2), 34, and leg columns 36, 38, 40, 42. In some exemplary embodiments, one or more leg columns 36, 38, 40, 42 may be height adjustable such that a height of frame 22 relative to one or more of wheels 28, 30, 32, 34 and/or ground surface 44 may be increased or decreased by adjusting a length of one or more leg columns 36, 38, 40, 42, respectively. As illustrated in FIG. 2, leg column 36 may connect frame 22 to the left front wheel 28, leg column 38 may connect frame 22 to a right front wheel 30, leg column 40 may connect frame 22 to left rear wheel 32 (not visible in FIG. 2), and leg column 42 may connect frame 22 to right rear wheel 34. Although, milling machine 20 has been illustrated in FIG. 2 as including wheels 28, 30, 32, 34, it is contemplated that milling machine 20 may instead include tracks 28, 30, 32, 34. One or more of wheels 28, 30, 32, 34 may be steerable, allowing milling machine 20 to be turned towards the right or left during a forward or rearward motion on ground surface 44.

Milling drum 50 of milling machine 20 may be located between first end 24 and second end 26. In one exemplary embodiment as illustrated in FIG. 2, milling drum 50 of milling machine 20 may not be directly attached to frame 22. Instead, as illustrated in FIG. 2 milling drum 50 of milling machine 20 may be attached to frame 22 via arms 74. Arms 74 may include a pair of arms (only one of which is visible in FIG. 2) disposed on either side of milling machine 20. Arms 74 may be pivotably attached to frame 22 and may be configured to be rotatable relative to frame 22. One or more actuators may be connected between frame 22 and arms 74 and may be configured to move arms 74 relative to frame 22. Thus, unlike milling machine 10, milling drum 50 of milling machine 20 may be movable relative to frame 22. It is contemplated, however, that in other exemplary embodiments, milling drum 50 may be directly attached to frame 22 of machine 20 in a manner similar to that described above for machine 10.

Milling drum 50 of milling machine 20 may include cutting tools 52 (or teeth 52). A height of milling drum 50 above the ground surface may be adjusted by rotating arms 74 relative to frame 22 and/or by adjusting one or more of leg columns 36, 38, 40, 42. As milling drum 50 rotates, teeth 52 may come into contact with and tear or cut the ground or roadway surface. Milling drum 50 may be enclosed within drum chamber 54 which may help contain the material removed by teeth 52 from the ground or roadway surface. Rotation of milling drum 50 may cause the removed material to be transferred from adjacent front end 76 of drum chamber 54 towards rear end 78 of drum chamber 54. Stabilizing components such as ash, lime, cement, water, etc. may be mixed with the removed material and the reconstituted mixture of the milled material and the stabilizing components may be deposited on ground surface 44 adjacent rear end 78 of drum chamber 54.

Like milling machine 10, milling machine 20 may also include engine 60, operator platform 62, one or more control or input devices 64, display 66, and controller 70, all of which may have structural and functional characteristics similar to those discussed above with respect to milling machine 10. Additionally, it will be understood that as used in this disclosure the terms front and rear are relative terms, which may be determined based on a direction of travel of milling machine 10 or 20. Likewise, it will be understood that as used in this disclosure, the terms left and right are relative terms, which may be determined based on facing the direction of travel of milling machine 10 or 20.

Figure 3A:
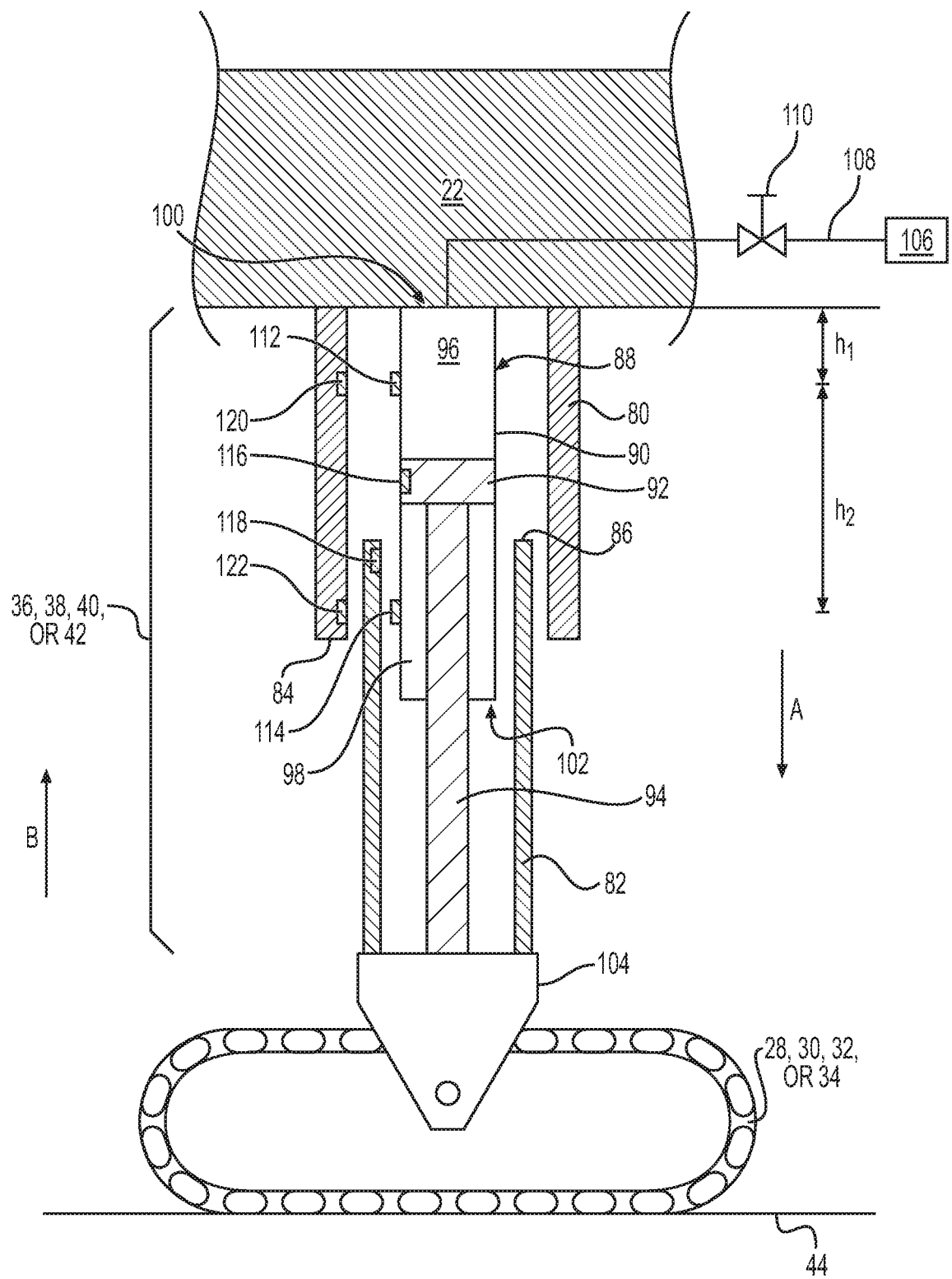
FIG. 3A is a partial cross-section view illustration of an exemplary leg column for the milling machines of FIGS. 1 and 2.

FIG. 3A is a partial cross-sectional view illustration of an exemplary leg column 36, 38, 40, 42 for milling machine 10 or 20. Leg column 36 may include first (or upper) section 80 and second (or lower) section 82. Actuator 88 may be disposed within or outside leg column 36. First section 80 may be attached to frame 22. In one exemplary embodiment, first section 80 may be rigidly attached to frame 22. First section 80 may extend from frame 22 towards track 28. In some exemplary embodiments, first section 80 may also extend into frame 22 in a direction away from track 28. Second section 82 may be attached to track 28 and may extend from track 28 toward frame 22.

In one exemplary embodiment as illustrated in FIG. 3A, first and second sections 80, 82 may be hollow cylindrical tubes. It is contemplated, however, that first and second sections 80, 82 may have other non-cylindrical shapes. First and second sections 80, 82 may be configured to slidably move relative to each other. As illustrated in the exemplary embodiment of FIG. 3A, second section 82 may have a smaller cross-section relative to first section 80 and may be received within first section 80. It is contemplated, however, that in other exemplary embodiments, first section 80 may have a smaller cross-section relative to second section 82 and may be received within second section 82. First and second sections 80, 82 may form a variable height enclosure within which actuator 88 may be located. It is also contemplated, however, that in some exemplary embodiments, actuator 88 may be located outside the enclosure formed by first and second sections 80, 82.

Actuator 88 may connect frame 22 with track 28. Actuator 88 may include cylinder 90, piston 92, and rod 94. Cylinder 90 may extend from frame end 100 connected to frame 22 to track end 102 which may be disposed between frame 22 and track 28. Piston 92 may be slidably disposed within cylinder 90 and may divide cylinder 90 into head-end chamber 96 and rod-end chamber 98. That is, piston 92 may be configured to slide within cylinder 90 from adjacent frame end 100 to adjacent track end 102. Head-end chamber 96 may be disposed nearer frame end 100 of cylinder 90 and rod-end chamber 98 may be disposed nearer track end 102 of cylinder 90. Rod 94 may be connected at one end to piston 92. Rod 94 may extend from piston 92, through track end 102 of cylinder 90, and may be directly or indirectly connected at an opposite end of rod 94 to track 28. In one exemplary embodiment as illustrated in FIG. 3A, rod 94 may be connected to yoke 104, which in turn may be connected to track 28. In some exemplary embodiments, yoke 104 may be fixedly attached to second section 82 of leg column 36. In other exemplary embodiments, yoke 104 may be a part of track 28 and may be movably attached to second section 82. It is also contemplated that in some embodiments, yoke 104 may not be attached to second section 82.

Although actuator 88 has been discussed in the context of leg column 36 of milling machine 10 or 20, it is contemplated that actuator 88 may instead be connected between any two portions of a construction machine and may be configured to move the two portions relative to each other. For example, frame end 100 of cylinder 90 may be connected to frame 22 and rod 94 may be connected to, for example, arm 74 of machine 20. By way of another example, frame end 100 of cylinder 90 may be connected to a boom of a construction machine (e.g. excavator, front wheel loader, etc.) and rod 94 may be connected to a work implement (e.g. bucket, shovel, etc.). In this arrangement actuator 88 may be configured to move the work implement relative to the boom of the construction machine.

Actuator 88 may be a single-acting or double-acting hydraulic actuator. For example, one or both of head-end chamber 96 and rod-end chamber 98 of actuator 88 may be configured to receive and hold the fluid. One or both of head-end chamber 96 and rod-end chamber 98 may be connected to tank 106 via conduit 108. Tank 106 may be configured to store the fluid. Control valve 110 may be configured to control a flow rate of the fluid into or out of actuator 88, for example, into or out of head-end chamber 96. In one exemplary embodiment as illustrated in FIG. 3A, control valve 110 may be disposed in conduit 108 between tank 106 and actuator 88. Although not shown in FIG. 3A, rod-end chamber 98 may also be connected to tank 106 via one or more conduits. In some exemplary embodiments, one or more additional control valves may be disposed in the one or more conduits connecting rod-end chamber 98 and tank 106. Filling head-end chamber 96 with the fluid and/or emptying the fluid from rod-end chamber 98 may cause piston 92 to slidably move within cylinder 90 in a direction shown by arrow "A" from frame end 100 toward track end 102. Piston movement in direction A may result in an increase in a length of actuator 88, causing first and second sections 80 and 82 to slidably move relative to each other thereby increasing a height of leg column 36, and thereby also increasing a height of frame 22 relative to track 28 or ground surface 44. Similarly, emptying the fluid from head-end chamber 96 and/or filling rod-end chamber 98 with the fluid may cause piston 92 to slidably move within cylinder 90 in a direction shown by arrow "B" from track end 102 towards frame end 100. Piston movement in direction B may decrease the length of actuator 88 thereby decreasing the height of leg column 36, which in turn may decrease the height of frame 22 relative to ground surface 44.

Leg column 36 may include one or more proximity sensors (or switching devices) 112, 114. As illustrated in FIG. 3A, proximity sensors 112 and 114 may be attached to cylinder 90 of actuator 88. For example, as illustrated in FIG. 3A, proximity sensor 112 may be attached to cylinder 90 at distance "$h_1$" relative to frame 22, and proximity sensor 114 may be attached to cylinder 90 at a predetermined length (or distance) "$h_2$" relative to proximity sensor 112. In one exemplary embodiment, piston 92 may include target 116. Additionally or alternatively, second section 82 may include target 118. In some exemplary embodiments, targets 116, 118 may extend around a portion of or all of a perimeter of piston 92 or second section 82, respectively. Although only one each of proximity sensors 112, 114 and targets 116, 118 are illustrated in FIG. 3A, it is contemplated that more than one of each of proximity sensor 112, 114 may be positioned on cylinder 90. Likewise, although only one each of targets 116, 118 is illustrated in FIG. 3A, it is contemplated that more than one target 116 may be circumferentially positioned on piston 92 and more than one target 118 may be circumferentially positioned on second section 82. Proximity sensors 112, 114 may be configured to generate a signal upon detecting target 116, for example, when piston 92 is positioned adjacent to a respective one of proximity sensors 112, 114. Likewise, proximity sensors 112, 114 may be configured to generate a signal upon detecting target 118, for example, when target 118 is positioned adjacent to a respective one of proximity sensors 112, 114.

It will be understood that when piston 92 is positioned adjacent proximity sensor 112, actuator 88 may be in a near fully retracted configuration, which in turn may correspond to a minimum allowable height of frame 22 above ground surface 44. In some exemplary embodiments, one or more teeth 52 of milling drum 50 may barely touch or scratch ground surface 44 in this configuration. Thus, a position of proximity sensor 112 may correspond to a scratch-height for milling machine 10 or 20. When piston 92 is instead positioned adjacent proximity sensor 114, actuator 88 may be in a near fully extended configuration, which in turn may correspond to a maximum allowable height of frame 22 relative to ground surface 44. Such a height may be used for inspection or maintenance of machine 10 or 20. Thus, a position of proximity sensor 114 may correspond to a pre-service height of machine 10 or 20.

Proximity sensors 112, 114 may include resistive, inductive, capacitive, optical, or any other type of proximity sensors. For example, proximity sensors 112, 114 may be configured to detect edge 86 of second section 82, target 116, or target 118 based on changes in inductance, capacitance, or in any other electrical property caused by positioning edge 86, target 116, or target 118 adjacent proximity sensors 112 or 114. In other exemplary embodiments, proximity sensors 112, 114 may include imaging devices that may be configured to detect edge 86, target 116, or target 118 as being disposed adjacent proximity sensors 112, 114, using image processing techniques.

In some exemplary embodiments, proximity sensors 112, 114 may be break beam sensors that may include receivers 120, 122 that may be attached to first section 80. It is contemplated, however, that in some embodiments, proximity sensors 112, 114 may be attached to first section 80 and corresponding receivers 120, 122, respectively, may be attached to cylinder 90. As illustrated in the exemplary embodiment of FIG. 3A, receiver 120 may be attached to first section 80 at distance $h_1$ relative to frame 22, and receiver 122 may be attached to first section 80 at distance $h_2$ relative to receiver 120. Receivers 120, 122 may be circumferentially positioned on first section 80 so that they may receive a generally collimated or focused beam of light (e.g. infrared, laser, or any other wavelength) or other electromagnetic radiation from proximity sensors 112, 114.

As discussed above, second section 82 may be configured to slidably move relative to first section 80. When edge 86 of second section 82 is positioned adjacent proximity sensors 112, 114, second section 82 may block the beam transmitted from proximity sensors 112, 114 preventing the beam from being received by receivers 120, 122, respectively. Proximity sensors 112, 114 may be triggered and may generate a signal in two scenarios. In the first scenario, beams transmitted by proximity sensors 112, 114 may be received by receivers 120, 122, respectively. As second section 82 moves relative to first section 80, edge 86 of second section 82 may block reception of the beams by receivers 120, 122. Proximity sensors 112 and 114 may generate a signal when beams previously being received by receivers 120, 122, respectively, are blocked. That is proximity sensors 112 and 114 may each generate a signal when there is a transition from an unblocked beam to a blocked beam. Conversely, in the second scenario, second section 82 may be positioned such that beams emanating from proximity sensors 112, 114 may be blocked by second section 82. As second section 82 moves relative to first section 80, the hitherto blocked beams may be unblocked so that receivers 120, 122 may begin receiving the beams emanating from proximity sensors 112, 114, respectively. Thus, proximity sensors 112, 114 may each generate a signal when there is a transition from a blocked beam to an unblocked beam. In both scenarios, proximity sensors 112 and 114 may generate signals when they detect the presence of edge 86 adjacent a respective proximity sensor 112, 114. Other arrangements of proximity sensors 112, 114, targets 116, 118, and/or receivers 120, 122 are also contemplated.

Figure 3B:
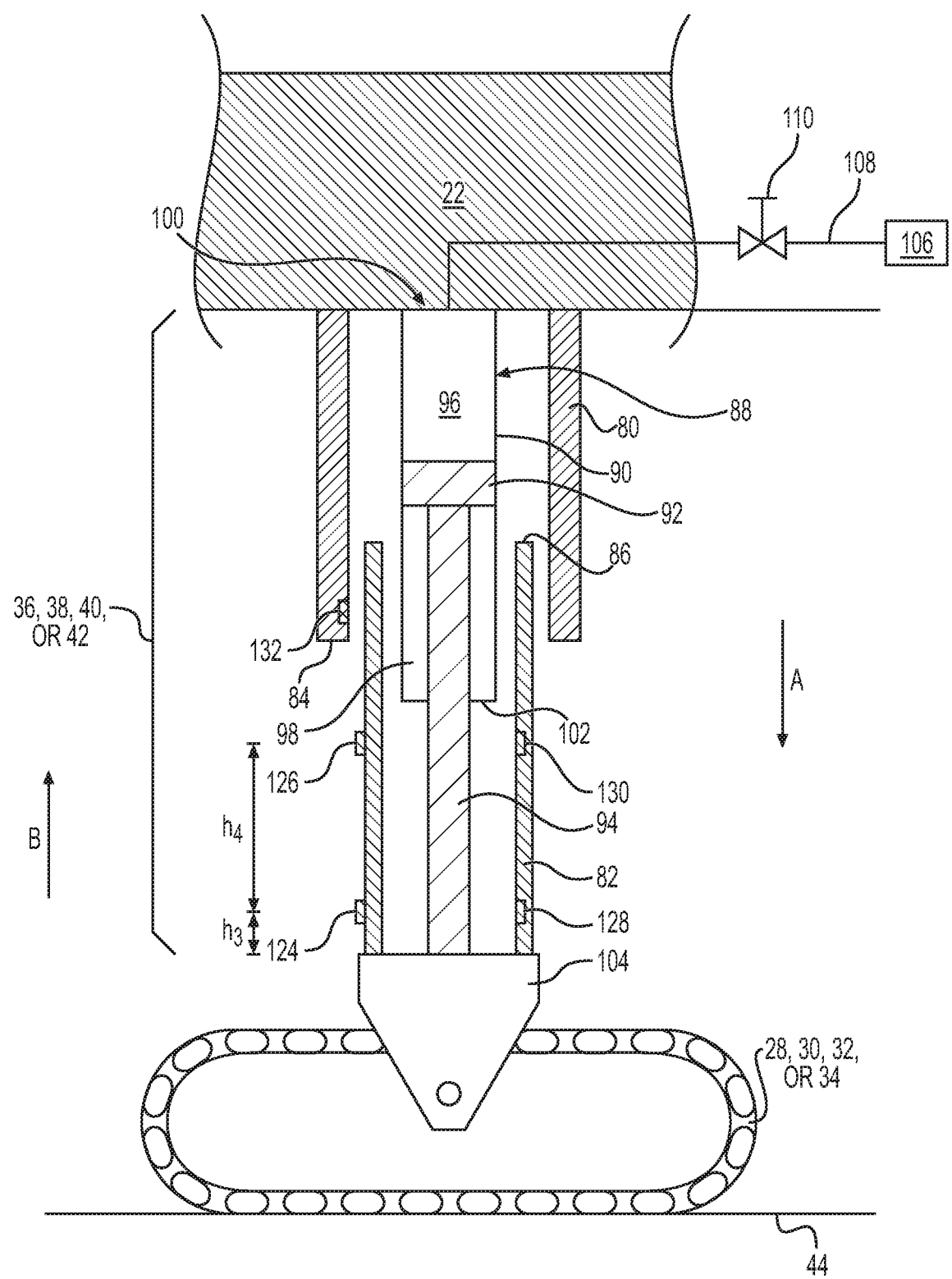
FIG. 3B is a partial cross-section view illustration of another exemplary leg column for the milling machines of FIGS. 1 and 2.

FIG. 3B is a partial cross-sectional view illustration of another exemplary leg column 36, 38, 40, 42 for milling machine 10 or 20. Many of the features of leg column 36, 38, 40, 42 illustrated in FIG. 3B are similar to those of leg column 36, 38, 40, 42 of FIG. 3A. In the following disclosure, only features of leg columns 36, 38, 40, 42 that are different in the embodiment of FIG. 3B will be discussed in detail. As illustrated in FIG. 3B, leg column 36 may additionally or alternatively include proximity sensors 124, 126, which may be attached to second section 82. For example, as illustrated in FIG. 3B, proximity sensor 124 may be attached to second section 82 at distance "$h_3$" relative to yoke 104, and proximity sensor 126 may be attached to second section 82 at a predetermined length (or distance) "$h_4$" relative to proximity sensor 124. Target 132 may be attached to first section 80 adjacent edge 84. Target 132 may extend around a portion of or all of a perimeter of first section 80. Proximity sensors 124, 126 may include resistive, inductive, capacitive, optical, or any other type of proximity sensors. For example, controller 70 may be configured to detect whether target 132 is positioned adjacent proximity sensors 124 or 126 based on changes in resistance, inductance, capacitance, optical images, or in any other electrical property caused by positioning track end 102, edge 84, or target 132 adjacent proximity sensors 124, 126.

It will be understood that when track end 102 of cylinder 90, edge 84 of first section 80, or target 132 are positioned adjacent proximity sensor 124, frame 22 may be disposed at its minimum allowable height from ground surface 44. Thus, a position of proximity sensor 124 may correspond to the scratch height of machine 10 or 20. In contrast, when track end 102 of cylinder 90, edge 84 of first section 80, or target 132 are positioned adjacent proximity sensor 126, frame 22 may be disposed at its maximum allowable height from ground surface 44. Thus, a position of proximity sensor 126 may correspond to the pre-service height of machine 10 or 20.

In some exemplary embodiments, proximity sensors 124, 126 may be break beam sensors and may include receivers 128, 130 respectively. When proximity sensors 124, 126 are break beam sensors, proximity sensors 124, 126 may be attached to an inner surface of second section 82. As illustrated in FIG. 3B, receiver 128 may be attached to second section 82 at distance "$h_3$" relative to track 28, and receiver 130 may be attached to second section 82 at distance "$h_4$" relative to receiver 128. Proximity sensors 124, 126, and receivers 128, 130 may have structural and functional characteristics similar to those discussed above with respect to proximity sensors 112, 114 and receivers 120, 122, respectively. The light or electromagnetic beam between proximity sensors 124, 126 and receivers 128, 130, respectively may be blocked or unblocked by track end 102 of cylinder 90 as actuator 88 is extended or retracted. In some exemplary embodiments where second section 82 has a size larger than first section 80, the light or electromagnetic beam between proximity sensors 112, 114 and receivers 120, 122, respectively may be blocked or unblocked by edge 84 of upper section 80. Thus, controller 70 may be configured to detect that track end 102 or edge 84 of first section 80 is positioned adjacent proximity sensors 124 or 126 based on whether the beams transmitted by proximity sensors 124 or 126 are blocked or unblocked.

Although targets 116, 118 (FIG. 3A) and target 132 (FIG. 3B) have been illustrated and described above as being positioned adjacent edges 84 or 86, it is contemplated that targets 116, 118, 132 may be positioned at any known distance from edges 84 or 86. Further, although only proximity sensors 112, 114, 124, 126, targets 116, 118, 132, and receivers 120, 122, 128, 130 are illustrated in FIGS. 3A and 3B and described above, it is contemplated that one or more leg columns 36, 38, 40, 42 may include any number of proximity sensors, targets, and/or receivers. It is also contemplated that one or more of leg columns 36, 38, 40, 42 may include some but not all of proximity sensors 112, 114, 124, 126, targets 116, 118, 132, and receivers 120, 122, 128, 130. It is also contemplated that in some exemplary embodiments, instead of being attached to leg column 36 or actuator 88, one or more of proximity sensors 112, 114, 124, 126, targets 116, 118, 132, and receivers 120, 122, 128, 130 may be attached to other structural members (e.g. slidable rods, tubes, etc.) disposed within the enclosure formed by first and second sections 80, 82. It is also contemplated that these slidable structural members may be attached to frame 22 and/or to track 28.

Control valve 110 (see FIG. 3A or 3B) may be a multi-position or proportional type valve having a valve element movable to regulate a flow of the fluid through conduit 108. In the flow-passing position, control valve 110 may permit the fluid to flow from or to tank 106 through conduit 108, substantially unrestricted by control valve 110. In contrast, in the flow-blocking position, control valve 110 may completely block the flow of the fluid from or to tank 106 through conduit 108. The valve element of control valve 110 may also be selectively movable to various positions between the flow-passing and flow-blocking positions to provide for variable flow rates of the fluid in conduit 108.

In one exemplary embodiment, a valve element in control valve 110 may be solenoid-operable to move between a flow-passing position and a flow-blocking position. That is, movement of the valve element of control valve 110 may be effected by one or more solenoids, which may be energized by allowing electric current to flow through the solenoids. An amount of movement of the valve element of control valve 110 may be based on an amount of current flowing through the one or more solenoids. Thus, a position of the valve element and consequently a flow rate of the fluid through control valve 110 may depend on an amount of electric current flowing through control valve 110. It will be understood that the flow rate of the fluid through control valve 110 may also affect a rate or velocity at which actuator 88 increases or decreases in length. Thus, the actuator velocity, which is the rate of extension or retraction of actuator 88, may depend on an amount of current flowing through the one or more solenoids associated with control valve 110.

Figure 4:
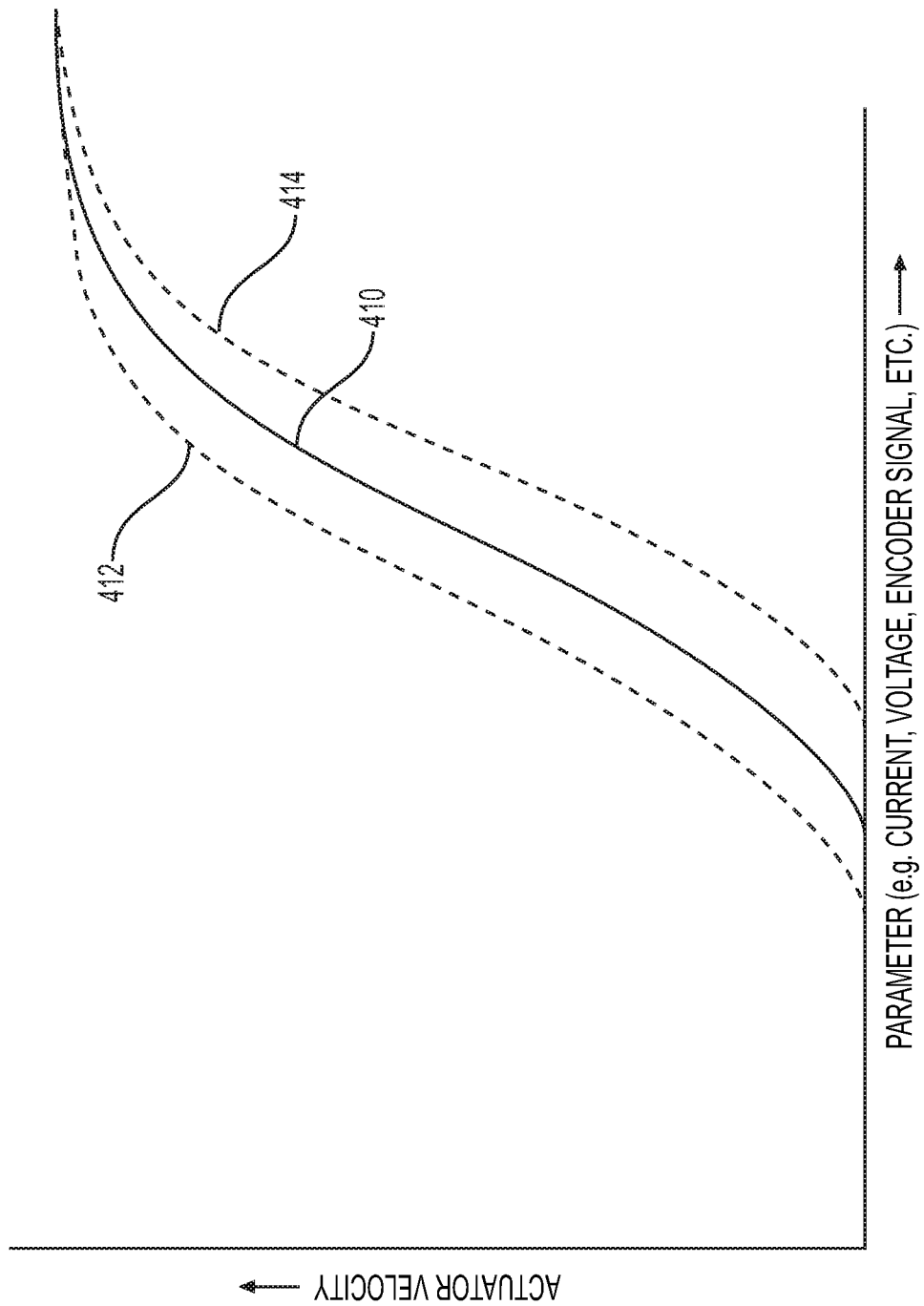
FIG. 4 is a chart showing an exemplary correlation between an amount of current flowing through a control valve and an actuator velocity for an exemplary disclosed actuator associated with the leg columns of FIGS. 3A and 3B.

FIG. 4 illustrates chart 400 showing exemplary variations of actuator velocity vs. current for control valve 110 depicted, for example, by lines 410, 412, and 414. In one exemplary embodiment as illustrated by line 410, actuator velocity of actuator 88 may increase with increasing amount of current supplied to the one or more solenoids of control valve 110. It is contemplated that the variation of the actuator velocity with current may take various shapes (e.g. linear, parabolic, hyperbolic, polynomial, etc.). Although line 410 in FIG. 4 illustrates that actuator velocity increases with increasing amount of current, it is contemplated that in some embodiments, actuator velocity may decrease with increasing amount of current or may have different (e.g. increasing vs. decreasing) behavior for different ranges of current. It is also contemplated that the variation of actuator velocity with the amount of current may not be continuous as illustrated by line 410, but instead may take discrete values or may be piecewise continuous. Various other mathematical relationships between current and actuator velocity are also contemplated. The data represented by line 410 or other data relating actuator velocity to current may be stored in memory device 72 associated with controller 70.

In some exemplary embodiments, the relationship between actuator velocity and current may be in the form of one or more lookup tables, which may be stored in memory device 72. Although FIG. 4 illustrates a two-dimensional relationship between current and actuator velocity, it is contemplated that the actuator velocity may additionally or alternatively depend on other parameters, such as, temperature, pump pressure, properties of the hydraulic oil (e.g. density, viscosity, etc.) and/or other operating parameters of milling machine 10 or 20. It is contemplated that relationships between an amount of current, actuator velocity, and/or these other machine parameters may be stored in the form of charts, graphs, mathematical functions, algorithms, and/or lookup tables in memory device 72.

Although the valve element of control valve 110 has been described above as being responsive to a current flowing through control valve 110, it is contemplated that other parameters may be used to control a movement of the valve element of control valve 110. For example, in some embodiments, valve element of control valve 110 may be responsive to an amount of voltage applied to the one or more solenoids associated with control valve 110. In this configuration, a relationship between voltage and actuator velocity may be stored in memory device 72 in the form of correlations, graphs, mathematical functions, algorithms, lookup tables, etc. In other exemplary embodiments, controller 70 may be configured to adjust an amount of movement of a linear or rotary encoder associated with control valve 110. For example, controller 70 may send a signal (e.g. pulse wave modulated signal) to adjust an amount of movement of an encoder, which in turn may produce movement of the valve element relative to, for example, the flow-blocking position of the valve element. The relationship between the amount of movement of the valve element or displacement of the encoder and the actuator velocity may be stored in memory device 72 in the form of correlations, graphs, mathematical functions, algorithms, lookup tables, etc. Controller 70 may be configured to use the information stored in memory device 72 to determine the amount of current, voltage, or encoder movement required for actuator 88 to extend or retract at a nominal (i.e. desired) actuator velocity. The nominal or desired actuator velocity may be selected by an operator of machine 10, 20 and may be any velocity between a minimum and maximum velocity of actuator 88.

Although element 110 has been described as a control valve above, it is contemplated that element 110 may instead take the form of individually controllable pumps or other fluid control devices. Regardless of whether element 110 is a control valve, pump, or other fluid control device, a current, a voltage, a mechanical movement, etc. associated with element 110 may be correlated to the actuator velocity for an actuator 88 associated with element 110.

Figure 5A:
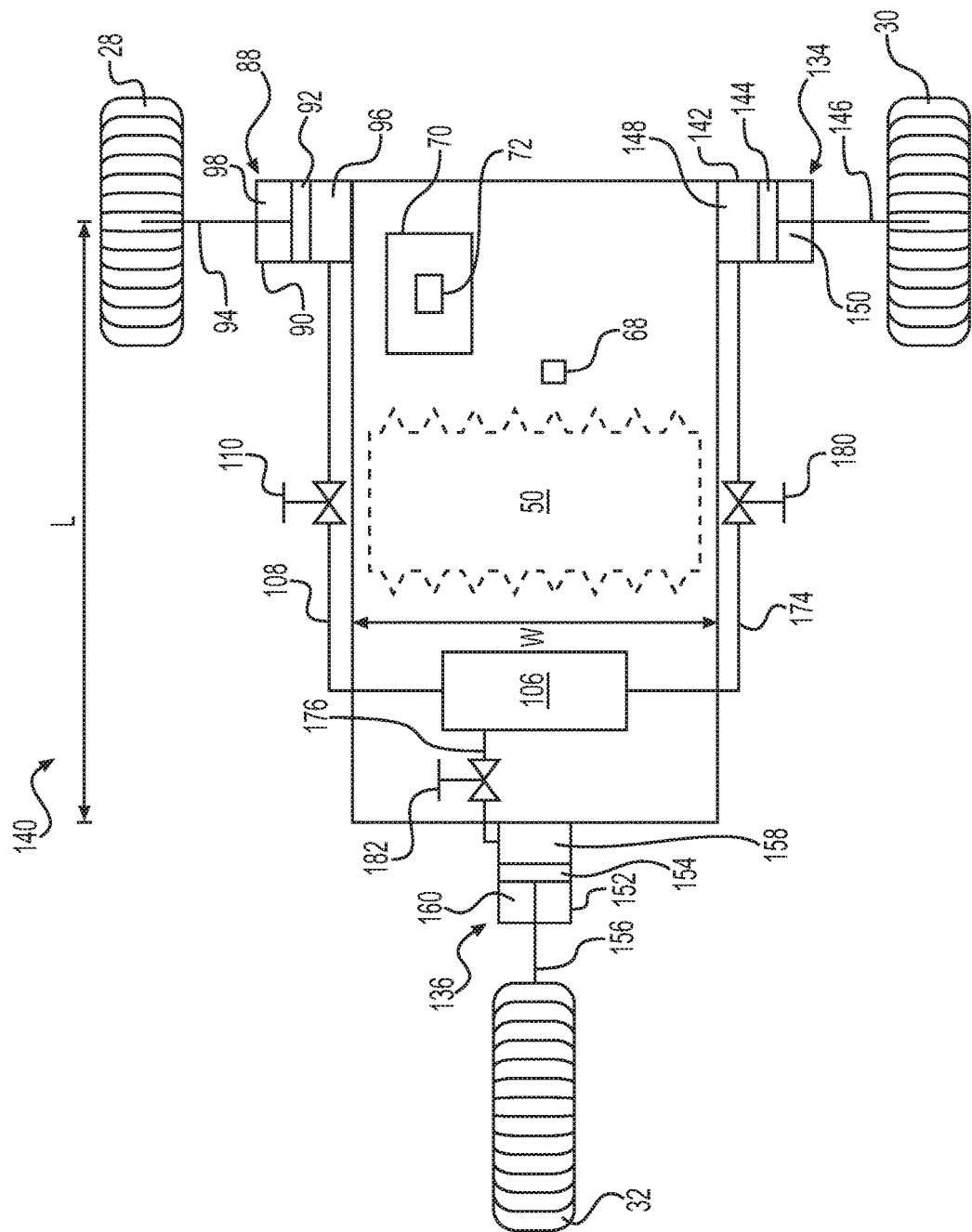
FIG. 5A is a partial schematic of an exemplary hydraulic circuit for the milling machines of FIGS. 1 and 2.

FIG. 5A illustrates a schematic of an exemplary hydraulic circuit 140 for milling machine 10 or 20. As illustrated in FIG. 5A, hydraulic circuit 140 may apply to milling machine 10 or 20 that may include two front tracks (e.g. left front track 28 and right front track 30) and one rear track 32. Left front track 28 may be connected to frame 22 via leg column 36 (see FIG. 1), right front track may be connected to frame 22 via leg column 38 (see FIG. 1), and rear track 32 may be connected to frame 22 via leg column 40 (see FIG. 1). As illustrated in FIG. 5A, rear track 32 may be positioned adjacent second end 26 of frame 22 and generally centered along a width "W" of frame 22.

Left front track 28 may be connected to frame 22 via left front actuator 88, right front track 30 may be connected to frame 22 via right front actuator 134, and rear track 32 may be connected to frame 22 via rear actuator 136. Rear actuator 136 may be spaced apart from left and right front actuators 88, 134 by a length "L." Similarly, left front actuator 88 may be spaced apart from right front actuator 134 by a width "W." Actuators 88, 134, and 136 may be located within or outside leg columns 36, 38, and 40, respectively. Left front actuator 88 may be a single-acting or double-acting hydraulic actuator and may have structural and functional characteristics similar to those described above with respect to FIGS. 3A and 3B. Right front actuator 134 may be a single-acting or double-acting hydraulic actuator and may include cylinder 142, piston 144, and rod 146. Piston 144 may be slidably disposed in cylinder 142 and may divide cylinder 142 into head-end chamber 148 and rod-end chamber 150. That is, piston 144 may be configured to slide within cylinder 142. One or both of head-end chamber 148 and rod-end chamber 150 may be configured to hold and receive the fluid. Cylinder 142 may be connected to frame 22 adjacent head-end chamber 148. Rod 146 may be connected at one end to piston 144 and at an opposite end to track 30. Similarly, rear actuator 136 may be a single-acting or double-acting hydraulic actuator and may include cylinder 152, piston 154, and rod 156. Piston 154 may be slidably disposed in cylinder 152 and may divide cylinder 152 into head-end chamber 158 and rod-end chamber 160. That is, piston 154 may be configured to slide within cylinder 152. One or both of head-end chamber 158 and rod-end chamber 160 may be configured to hold and receive the fluid. Cylinder 152 may be connected to frame 22 adjacent head-end chamber 158. Rod 156 may be connected at one end to piston 154 and at an opposite end to track 32. Actuators 134 and 136 may have structural and functional characteristics similar to those described above for actuator 88 with respect to FIGS. 3A and 3B.

Milling machine 10 or 20 may also include tank 106, which may be configured to store the fluid. One or more of head-end chambers 96, 148, 158, and/or rod-end chambers 98, 150, 160 may be connected to tank 106 and may receive the fluid from or direct the fluid to tank 106. For example, as illustrated in FIG. 5A, conduit 108 may connect tank 106 with head-end chamber 96 of actuator 88, conduit 174 may connect tank 106 with head-end chamber 148 of actuator 134, and conduit 176 may connect tank 106 to head-end chamber 158 of actuator 136. Thus, for example, the fluid may flow from tank 106 to one or more of head-end chambers 96, 148, 158 or vice versa. Milling machine 10 or 20 may include additional conduits, control valves, pressure relief valves, pumps, filters and other hydraulic components connecting actuators 88, 134, and/or 136 to tank 106. For example, it is contemplated that rod-end chambers 98, 150, and 160 may also be connected to tank 106 via conduits, which may include control valves to control the flow rate of the fluid between tank 106 and one or more of rod-end chambers 98, 150, and 160. Discussion of these additional hydraulic components in this disclosure is omitted for succinctness and clarity.

Control valve 110 may be disposed in conduit 108 and may be configured to control a flow rate of the fluid between tank 106 and head-end chamber 96. Control valve 180 may be disposed in conduit 174 and may be configured to control a flow rate of the fluid between tank 106 and head-end chamber 148. Control valve 182 may be disposed in conduit 176 and may be configured to control a flow rate of the fluid between tank 106 and head-end chamber 158. Control valves 180 and 182 may have structural and functional characteristics similar to those of control valve 110 describe above with respect to FIGS. 3A and 3B.

Figure 5B:
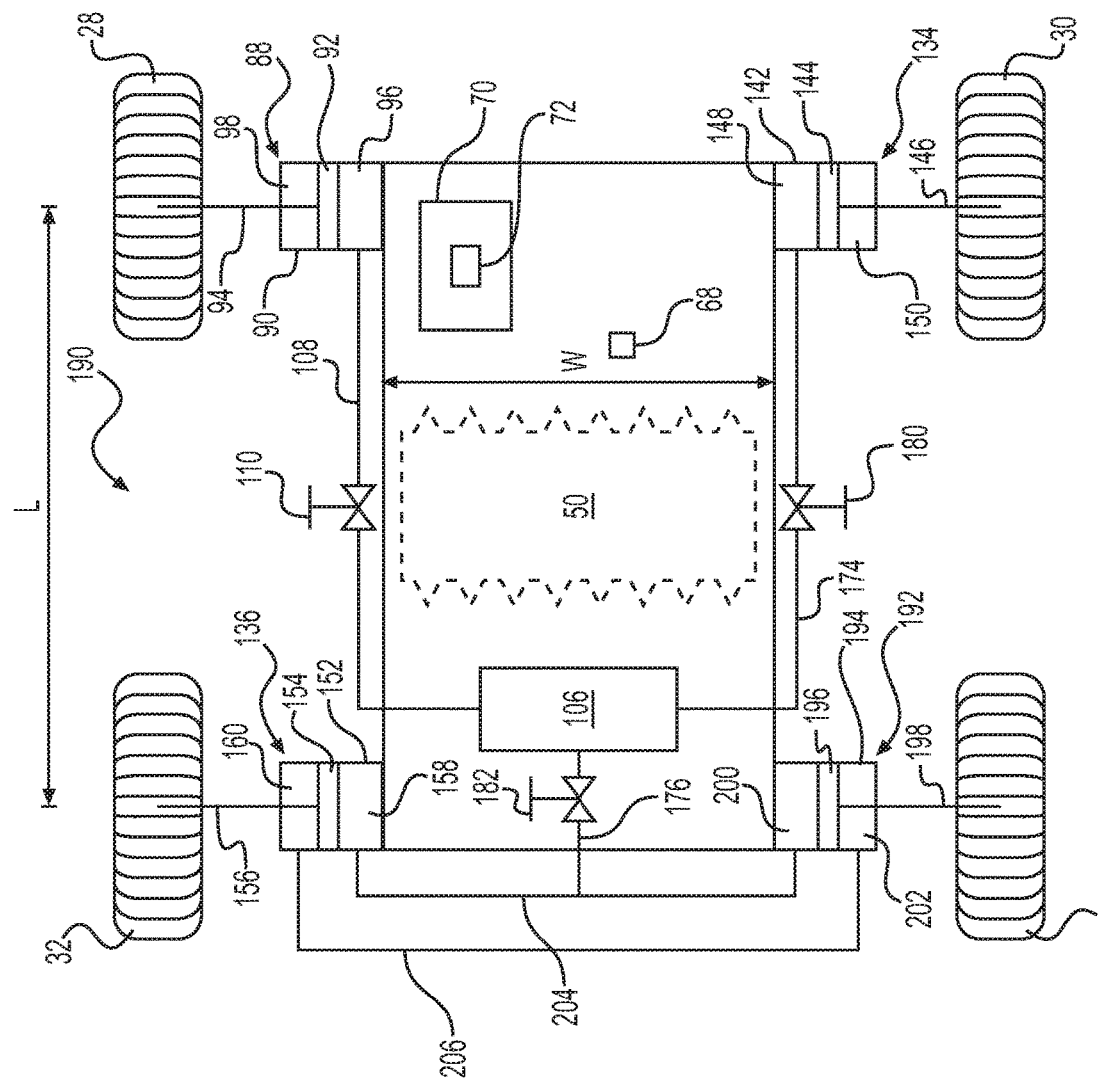
FIG. 5B is a partial schematic of another exemplary hydraulic circuit for the milling machines of FIGS. 1 and 2.

FIG. 5B illustrates a schematic of another exemplary hydraulic circuit 190 for milling machine 10 or 20. As illustrated in FIG. 5B, hydraulic circuit 190 may apply to milling machine 10 or 20 that includes two front tracks (e.g. left front track 28 and right front track 30) and two rear tracks (e.g. left rear track 32 and right rear track 34). Many of the features of hydraulic circuit 190 illustrated in FIG. 5B are similar to those of hydraulic circuit 140 of FIG. 5A. In the following disclosure, only features of hydraulic circuit 190 that are different from those of hydraulic circuit 140 will be discussed in detail. As described above with respect to FIG. 5A, left front track 28 may be connected to frame 22 via leg column 36 (see FIG. 1), right front track may be connected to frame 22 via leg column 38 (see FIG. 1), and left rear track 32 may be connected to frame 22 via leg column 40 (see FIG. 1). Furthermore, right rear track 34 may be connected to frame 22 via leg column 42 (see FIG. 1). As illustrated in FIG. 5B, however, left rear track 32 may be positioned adjacent one side of frame 22 and right rear track 34 may be positioned adjacent an opposite side of frame 22 and laterally spaced apart from left rear track 32 along a width W of frame 22.

Left front track 28 may be connected to frame 22 via left front actuator 88, right front track 30 may be connected to frame 22 via right front actuator 134, left rear track 32 may be connected to frame 22 via left rear actuator 136, and right rear track 34 may be connected to frame 22 via right rear actuator 192. Actuators 88, 134, 136, and 192 may be located within or outside leg columns 36, 38, 40, 42, respectively. Left front actuator 88, right front actuator 134, and left rear actuator 136 may have structural and functional characteristics similar to those described above. Right rear actuator 192 may include cylinder 194, piston 196, and rod 198. Piston 196 may be slidably disposed within cylinder 194 and may divide cylinder 194 into head-end chamber 200 and rod-end chamber 202. That is piston 196 may be configured to slide within cylinder 194. One or both of head-end chamber 200 and rod-end chamber 202 may be configured to hold and receive the fluid. Cylinder 194 may be connected to frame 22 adjacent head-end chamber 200. Rod 198 may be connected at one end to piston 196 and at an opposite end to track 34. Like actuators 134 and 136, right rear actuator 192 may have structural and functional characteristics similar to those described above for actuator 88 with respect to FIGS. 3A and 3B As also illustrated in FIG. 5B, left rear actuator 136 and right rear actuator 192 may be connected to each other to form a full-floating axle. For example, head-end chamber 158 of left rear actuator 136 may be connected to head-end chamber 200 of right rear actuator 192 via head-end conduit 204. Similarly, rod-end chamber 160 of left rear actuator 136 may be connected to rod-end chamber 202 of right rear actuator 192 via rod-end conduit 206. Conduit 176 may connect tank 106 to head-end conduit 204. Thus, the fluid may flow from tank 106 to both head-end chambers 158 and 200 of left rear actuator 136 and right rear actuator 192. Control valve 182 may be disposed in conduit 176. Although FIG. 5B illustrates left rear actuator 136 and right rear actuator 192 as being connected via head-end conduit 204 and rod-end conduit 206, it is contemplated that in some exemplary embodiments, left rear actuator 136 and right rear actuator 192 may not be connected to each other. In this configuration, head-end chambers 158 and 200 of left rear actuator 136 and right rear actuator 192, respectively, may be separately connected to tank 106 via separate conduits. Each of these conduits may include its own control valve which may have structural and functional characteristics similar to those of control valves 178, 180, 182.

A method of calibrating the actuator velocity for one or more of actuators 88, 134, 136, and/or 192 in one or more of leg columns 36, 38, 40, 42 of milling machine 10 or 20 will be described in more detail below.

INDUSTRIAL APPLICABILITY

Controller 70 may adjust a length of one or more of actuators 88, 134, 136, and/or 192 in one or more of leg columns 36, 38, 40, 42, respectively, to adjust a height of frame 22 of milling machine 10 or 20 relative to ground surface 44. In particular, controller may adjust one or more control valves 110, 180, and/or 182 associated with actuators 88, 134, 136, and/or 192 to cause a flow of the fluid into or out of actuator 88, 134, 136, and/or 192 to raise or lower the height of frame 22 relative to ground surface 44. Controller 70 may also be configured to calibrate the relationship between actuator velocity and a control parameter (e.g. current, voltage, encoder signal, encoder movement, valve element movement, etc.) to ensure that the rate at which frame 22 is raised or lowered matches the nominal or desired velocity at which an operator of milling machine 10, 20 desires to raise or lower frame 22.

Figure 6:
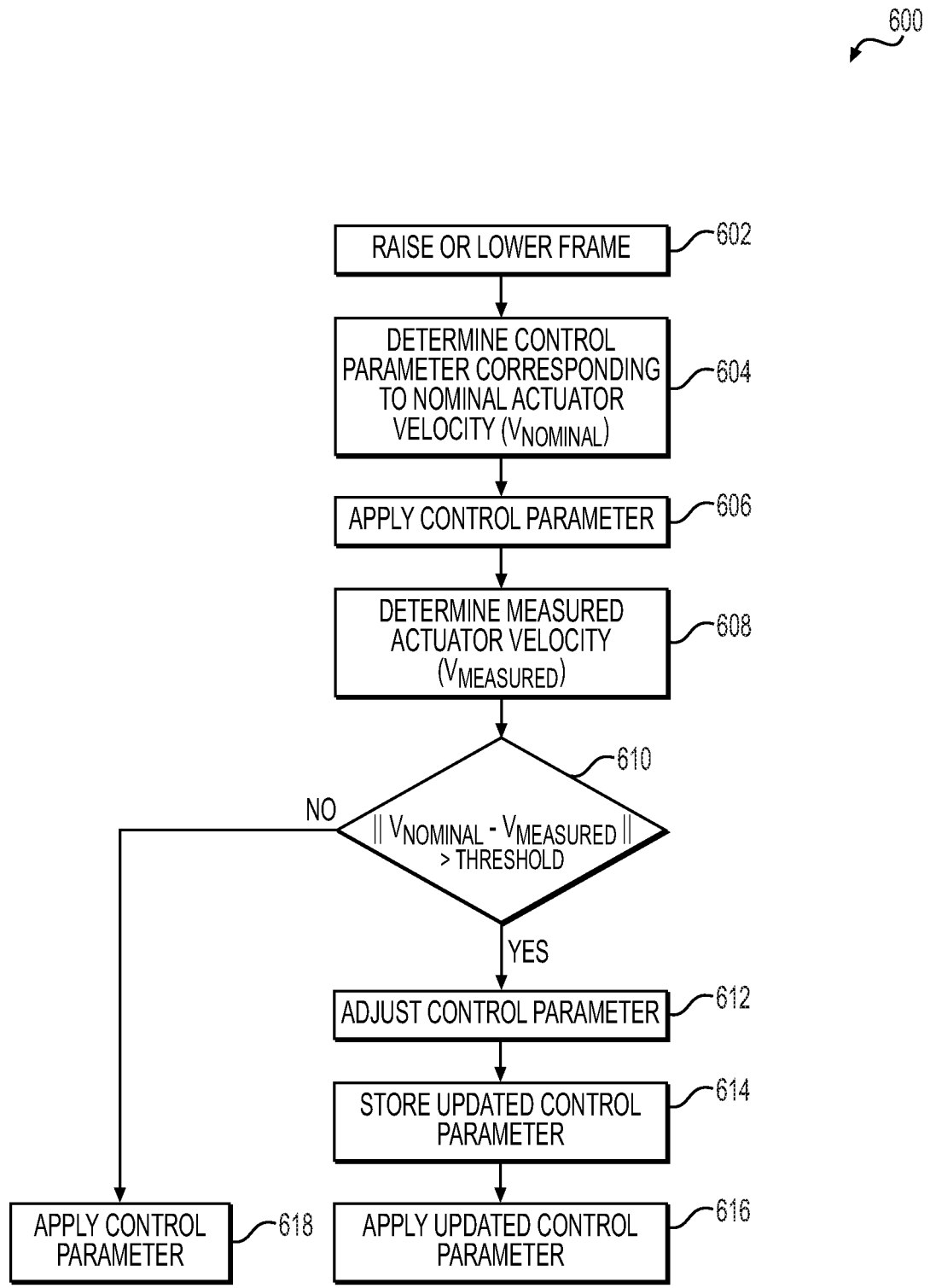
FIG. 6 is an exemplary chart illustrating a method of calibrating an actuator velocity based on an amount of extension or retraction of an actuator.

FIG. 6 illustrates an exemplary method 600 of calibrating control valve 110 associated with actuator 88. The order and arrangement of steps of method 600 is provided for purposes of illustration. As will be appreciated from this disclosure, modifications may be made to method 600 by, for example, adding, combining, removing, and/or rearranging the steps of method 600. Method 600 may be executed by controller 70. In some exemplary embodiments, method 600 may be executed by controller 70 when an operator raises or lowers frame 22 relative to ground surface 44. Although method 600 is described below with reference to front actuator 88, method 600 and its steps as described below and as illustrated in FIG. 6 are equally applicable to front actuator 134, and rear actuators 136, 192.

Method 600 may include a step of raising or lowering frame 22 relative to ground surface 44 (Step 602). An operator may perform such an operation, for example, to raise the frame to a pre-service height for performing maintenance operations or to position frame 22 at a particular height (e.g. scratch height) and/or inclination relative to the ground surface before beginning milling operations. Controller 70 may receive signals from one or more input devices 64 indicating that an operator desires to raise or lower frame 22 of milling machine 10 or 20. In response, controller 70 may cause one or more pumps associated with milling machine 10 or 20 to pump fluid from tank 106 into or out of head-end chamber 96 via conduit 108 to extend or retract actuator 88.

Method 600 may include a step of determining a control parameter for control valve 110 corresponding to a nominal actuator velocity "$V_{NOMINAL}$" (Step 604). For example, controller 70 may receive a signal from input device 64 indicating a speed at which an operator desires to raise or lower frame 22. By way of example, input device 64 may have multiple positions corresponding to different speeds (or rates) at which frame 22 may be raised or lowered relative to ground surface 44. Controller 70 may be configured to determine a nominal actuator velocity $V_{NOMINAL}$ for actuator 88 based on a position of input device 64. Controller 70 may also be configured to determine a control parameter (e.g. current, voltage, encoder signal, etc.) for control valve 110. For example, controller 70 may be configured to determine an amount of current that must flow through control valve 110 to cause actuator 88 to extend or retract at the nominal (or desired) actuator velocity. Controller 70 may determine the amount of current based on data relating actuator velocity and current stored in memory device 72. As discussed above the data relating actuator velocity and current may include one or more of correlations, graphs, tables, algorithms, etc. For example, controller 70 may rely on the relationship represented by line 410 of FIG. 4 to determine the amount of current corresponding to the nominal actuator velocity $V_{NOMINAL}$.

Method 600 may include a step of applying the control parameter to control valve 110 (Step 606). For example, controller 70 may be configured to apply the amount of current determined, for example, in step 604 to control valve 110. In some exemplary embodiments, controller 70 may interact with one or more electrical power sources associated with machines 10 or 20 to apply the determined control parameter (e.g. amount of current or amount of voltage) to one or more solenoids associated with control valve 110. This in turn may cause a valve element to move from its flow blocking position and permit a flow of the fluid into or out of actuator 88. In other exemplary embodiments, controller 70 may apply the determined control parameter (e.g. signal) to an encoder, which in turn may cause movement of the valve element, permitting flow of the fluid into or out of actuator 88.

Method 600 may include a step of determining measured actuator velocity "$V_{MEASURED}$" (Step 608). Controller 70 may be configured to determine measured actuator velocity, $V_{MEASURED}$, based on signals received from one or more of proximity sensors 112, 114, 124, and/or 126. By way of example, consider a configuration in which proximity sensors 112 and 114 are attached to cylinder 90 of actuator 88, piston 92 includes target 116, and frame 22 of milling machine 10, 20 is being raised relative to ground surface 44. It will be understood that to raise frame 22, actuator 88 would extend causing piston 92 to move in a direction A (see FIG. 3A). Controller 70 may receive a first signal generated by proximity sensor 112 at a first time "$t_1$" when proximity sensor 112 detects target 116 because piston 92 is positioned adjacent proximity sensor 112. As piston 92 continues to move in direction A, controller 70 may receive a second signal generated by proximity sensor 114 at a second time "$t_2$" when proximity sensor detects target 116 because piston 92 is positioned adjacent proximity sensor 114. Controller 70 may determine a time $\Delta t$ taken by piston 92 to travel from adjacent proximity sensor 112 to adjacent proximity sensor 114 as the difference between times $t_2$ and $t_1$. In one exemplary embodiment, controller 70 may determine measured actuator velocity, $V_{MEASURED}$, based on the predetermined length $h_2$ and the time elapsed $\Delta t$ as "$h_2/\Delta t$." It is contemplated, however, that controller 70 may employ other correlations, look up tables, graphs, or algorithms stored in memory device 72 to determine measured actuator velocity, $V_{MEASURED}$, based on distance $h_2$ and the time elapsed $\Delta t$.

By way of another example, consider a configuration in which proximity sensors 112 and 114 are break beam sensors attached to cylinder 90 of actuator 88, and receivers 120 and 122 are attached to first section 80. Further, consider a configuration where edge 86 of second section 82 is positioned adjacent frame 22 such that second section 82 blocks the light or electromagnetic beams directed by proximity sensors 112, 114 towards receivers 120, 122, respectively. As actuator 88 extends to raise frame 22 relative to ground surface 44, edge 86 of second section 82 may travel in direction A and may unblock receiver 120. Thus, controller 70 may receive a first signal generated by proximity sensor 112 at a first time $t_1$, when receiver 120 receives a hitherto blocked light or electromagnetic beam from proximity sensor 112. As actuator 88 continues to extend, edge 86 of second section 82 may unblock receiver 122. Thus, controller 70 may receive a second signal generated by proximity sensor 114 at a second time $t_2$, when receiver 122 receives a hitherto blocked light or electromagnetic beam from proximity sensor 114. Controller 70 may determine the time $\Delta t$ taken by edge 86 to travel from adjacent proximity sensor 112 to adjacent proximity sensor 114 as the difference between times $t_2$ and $t_1$. It will be understood that during time $\Delta t$, actuator 88 would have extended by a predetermined length, which may be about equal to $h_2$. As used in this disclosure, "about equal" should be interpreted to encompass normal measurement errors and manufacturing tolerances. Thus, for example, about equal lengths may include lengths that differ by ±1 mm, ±0.1 cm, ±0.1 inch, etc. Similarly for example, about equal velocities may include velocities that differ by less than ±1 mm/s, ±0.1 cm/s, ±0.1 inch/s, etc. Controller 70 may determine measured actuator velocity, $V_{MEASURED}$, based on the predetermined distance $h_2$ and the time elapsed $\Delta t$ as "$h_2/\Delta t$." It is contemplated, however, that controller 70 may employ other correlations, look up tables, graphs, or algorithms stored in memory device 72 to determine measured actuator velocity, $V_{MEASURED}$, based on distance $h_2$ and the time elapsed $\Delta t$. As another example, when controller 70 receives signals from proximity sensors 124, 126, the predetermined length may correspond to the distance $h_4$ between proximity sensors 124, 126. In this configuration, controller 70 may determine measured actuator velocity, $V_{MEASURED}$ based on distance $h_4$ and the time elapsed $\Delta t$.

Method 600 may include a step of determining whether a difference between the measured actuator velocity $V_{MEASURED}$ and the nominal actuator velocity $V_{NOMINAL}$ exceeds a predetermined threshold (Step 610). In step 610, controller may determine an absolute value of the difference $\Delta V = \|V_{MEASURED} - V_{NOMINAL}\|$ and compare $\Delta V$ to a threshold. It will be understood that when $V_{MEASURED}$ is about equal to $V_{NOMINAL}$, the difference $\Delta V$ would be about equal to zero.

When the difference $\Delta V$ is greater than the threshold (Step 610: YES), method 600 may proceed to a step of adjusting the control parameter (Step 612). In step 612, controller 70 may determine the control parameter required to ensure that $\Delta V$ is about equal to zero. For example, controller 70 may be configured to determine an adjusted amount of current that must be supplied to control valve 110 such that the measured actuator velocity $V_{MEASURED}$ is about equal to the nominal actuator velocity $V_{NOMINAL}$ or $\Delta V$ is about equal to zero. In one exemplary embodiment, controller 70 may rely on the relationship between actuator velocity and current (e.g. line 410 of FIG. 4) stored in memory device 72 to determine the adjusted amount of current. For example, referring to FIG. 4, when the measured actuator velocity $V_{MEASURED}$ is greater than the nominal actuator velocity $V_{NOMINAL}$, controller 70 may determine a change in the amount of current "ΔI" required to reduce the measured actuator velocity $V_{MEASURED}$ by the velocity difference ΔV based on the relationship embodied by line 410. Likewise, when the measured actuator velocity $V_{MEASURED}$ is smaller than the nominal actuator velocity $V_{NOMINAL}$, controller 70 may determine the change "ΔI" required to increase the measured actuator velocity $V_{MEASURED}$ by the velocity difference ΔV based on the relationship embodied by line 410. In yet other exemplary embodiments, controller 70 may use correlations, graphs, look up table, algorithms, etc. to determine the change in the amount of current ΔI in step 612.

In some exemplary embodiments, controller 70 may increase or decrease the amount of current by a predetermined value ΔI, which may be stored in memory device 72. Controller 70 may then repeat steps 606-610 during a subsequent frame raise/lower operation to determine whether the difference ΔV is less than or equal to the threshold. When the difference ΔV is greater than the threshold, controller 70 may adjust the predetermined value ΔI and repeat steps 606-610 during a subsequent frame raise/lower operation. When, however, the difference ΔV is less than or equal to the threshold, controller may proceed to step 618.

Method 600 may proceed from step 612 to a step of storing the updated control parameter (Step 614). In step 614, controller 70 may update, for example, the relationship depicted by line 410 based on the change ΔI in the amount of current determined in, for example, step 612. Thus, for example, when $V_{MEASURED}$ is greater than $V_{NOMINAL}$, controller 70 may subtract ΔI from the current values associated with the various actuator velocity values represented by line 410 to arrive at line 412. In other exemplary embodiments, when $V_{MEASURED}$ is smaller than $V_{NOMINAL}$, controller 70 may add ΔI from the current values associated with the various actuator velocity values represented by line 410 to arrive at line 412. It is also contemplated that controller 70 may use other mathematical operations or algorithms to generate data relating the actuator velocity and the current based on the change ΔI determined in step 612. Controller 70 may store the relationship between actuator velocity and the updated amount of current represented by, for example, line 412 and/or line 414 in memory 72.

Method 600 may include a step of applying the updated control parameter for raising or lowering frame 22 relative to ground surface 44 (Step 616). For example, controller 70 may use the updated relationship depicted by line 412 or 414 to determine the amount of current required to extend or retract actuator 88 at the nominal actuator velocity when an operator subsequently raises or lowers frame 22 relative to ground surface 44. Returning to step 610, when the difference ΔV is not greater than the predetermined threshold (Step 610: NO), method 600 may proceed to step 618. In step 618, controller 70 may continue to apply the control parameter determined, for example, in step 604. Thus, for example, controller 70 may continue to apply the amount of current previously determined in step 604 to control valve 110.

Controller 70 may be configured to perform method 600 to calibrate the actuator velocity for actuator 88 based on a distance between pairs of proximity sensors 112, 114, or 124, 126. Controller 70 may perform method 600 each time an operator raises or lowers frame 22 at the same or different nominal actuator velocities. By performing calibration at different nominal actuator velocities, controller 70 may determine an accurate relationship between the amount of current and actuator velocity for actuator 88 over a whole range of actuator velocities. Furthermore, calibrating control valve 110 based on a measurement of actuator velocity $V_{MEASURED}$ may provide an improved and more accurate relationship between actuator velocity and current as compared to performing calibrations solely based on cracking current. Controller 70 may also perform method 600 to individually calibrate each of the other actuators 134, 136, and/or 192 associated with machine 10 or 20. This in turn may help establish a more accurate relationship between actuator velocity and current for each of the actuators 88, 134, 136, and/or 192 taking into account variations in manufacturing and installation, and differences in amounts of wear and tear of the different actuators.

Figure 7:
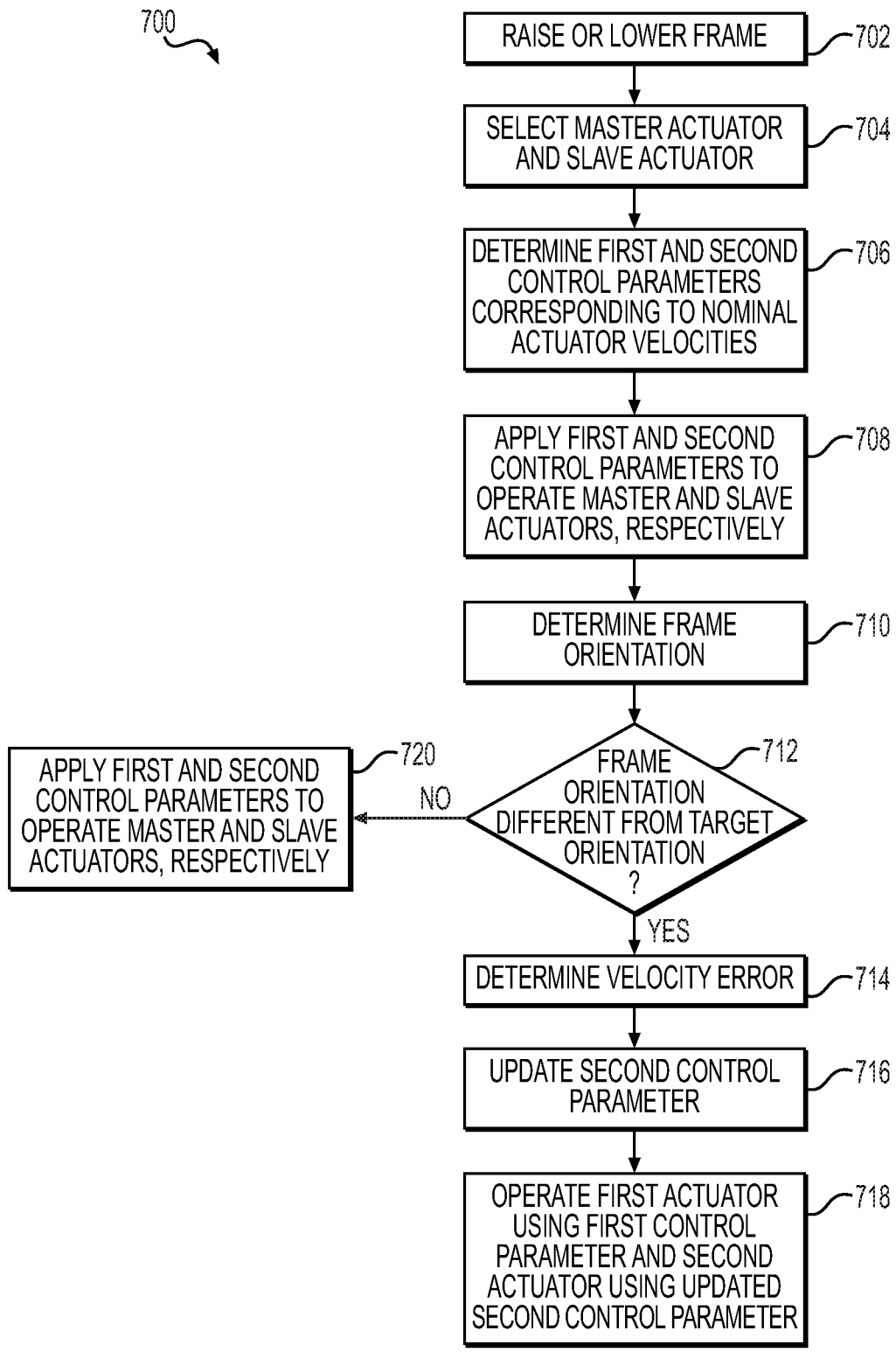
FIG. 7 is an exemplary chart illustrating a method calibrating an actuator velocity based on a relative velocity between pairs of actuators.

In some exemplary embodiments, controller 70 may perform a distance based calibration of actuator velocity as discussed above with respect to method 600 for one of the actuators 88, 134, 136, and/or 192. Controller 70 may then calibrate the actuator velocity for one or more of the other actuators based on a relative velocity between two actuators. FIG. 7 illustrates an exemplary method 700 of calibrating actuator velocities based on a relative velocity between pairs of actuators. The order and arrangement of steps of method 700 is provided for purposes of illustration. As will be appreciated from this disclosure, modifications may be made to method 700 by, for example, adding, combining, removing, and/or rearranging the steps of method 700. Method 700 may be executed by controller 70 when an operator raises or lowers frame 22 relative to ground surface 44.

Method 700 may include a step of raising or lowering frame 22 relative to ground surface 44 (Step 702). An operator may perform such an operation, for example, to raise the frame to a pre-service height for performing maintenance operations or to position frame 22 at a particular height (e.g. scratch height) and/or inclination relative to the ground surface before beginning milling operations. Controller 70 may receive signals from one or more input devices 64 indicating that an operator desires to raise or lower frame 22 of milling machine 10 or 20. In response, controller 70 may cause one or more pumps associated with milling machine 10 or 20 to pump the fluid from tank 106 into or out of head-end chamber 96 via conduit 108 to extend or retract one or more of actuators 88, 134, 136, and/or 192.

Method 700 may include a step of selecting a master actuator (first actuator) and a slave actuator (second actuator) (Step 704). In step 704, controller 70 may select a master actuator or first actuator from actuators 88, 134, 136, and/or 92. In one exemplary embodiment, controller 70 may select as a master actuator, an actuator that may have been calibrated using, for example, method 600 during a previous operation of raising or lowering frame 22. In another exemplary embodiment, controller 70 may be configured to receive a selection of a master actuator from an operator via, for example, one or more of input devices 64. In step 704, controller 70 may also select a slave actuator different from the master actuator. Controller 70 may either select the slave actuator automatically or in response to an input from an operator received via, for example, one or more of input devices 64. By way of example, controller 70 may select rear actuator 136 as a master actuator (or first actuator) and left front actuator 88 as a slave actuator (second actuator). By way of another example, controller 70 may select left front actuator 88 as a master actuator (first actuator) and right front actuator 134 as a slave actuator (second actuator).

Method 700 may include a step of determining first and second control parameters corresponding to nominal actuator velocities for the master and slave actuators, respectively (Step 706). For example, controller 70 may receive a signal from input device 64 indicating a speed at which an operator desires to raise or lower frame 22. By way of example, input device 64 may have multiple positions corresponding to different speeds (or rates) at which frame 22 may be raised or lowered relative to ground surface 44. Controller 70 may be configured to determine nominal actuator velocities for the master and slave actuators based on one or more positions of input devices 64. In some exemplary embodiments, an operator may desire to change the orientation of frame 22 during the frame raise/lower operation. In these embodiments, controller 70 may determine different nominal actuator velocities for the master and slave actuators based on the positions of input devices 64. In other exemplary embodiments, the operator may desire to maintain the orientation of frame 22 during the frame raise/lower operation. In these embodiments, controller 70 may determine that the nominal actuator velocities for the master and slave actuators are about equal. Controller 70 may also be configured to determine control parameters (e.g. current, voltage, encoder signal, etc.) for control valves associated with the master and slave actuators. For example, when rear actuator 136 is the master actuator and left front actuator 88 is the slave actuator, controller 70 may determine a first control parameter for control valve 182 associated with rear actuator 136 and a second control parameter associated for control valve 110 associated with left front actuator 88. Likewise, for example, when left front actuator 88 is the master actuator and right front actuator 134 is the slave actuator, controller 70 may determine a first control parameter for control valve 110 associated with left front actuator 88 and a second control parameter for control valve 180 associated with right front actuator 134. Controller 70 may rely on relationships similar to those depicted in FIG. 4 for the control valves associated with the master and slave actuators to determine the control parameter. For example, when rear actuator 136 is the master actuator, controller 70 may determine an amount of current (e.g. first amount of current) required by control valve 182 for actuator 136 to extend or retract at the nominal actuator velocity $V_{NOMINAL}$ based on relationships similar to those depicted by line 410 of FIG. 4. Similarly, when left front actuator 88 is the slave actuator, controller 70 may determine an amount of current (e.g. second amount of current) required by control valve 180 for actuator 88 to extend or retract at the nominal actuator velocity $V_{NOMINAL}$ based on relationships similar to those depicted by line 410 of FIG. 4. Controller 70 may determine the first and second amounts of current based on data relating actuator velocity and current stored in memory device 72. As discussed above, the data relating actuator velocity and current may include one or more of correlations, graphs, tables, algorithms, etc. It is to be understood that different sets of data may be stored in memory device 72 for each of the control valves 110, 180, and 182 associated with machine 10 or 20.

Method 700 may include a step of applying the first and second control parameters to operate the master and slave actuators, respectively (Step 708). For example, when rear actuator 136 is selected as the master actuator and left front actuator 88 is selected as a slave actuator, controller 70 may apply the first amount of current to control valve 182 associated with rear actuator 136 and the second amount of current to control valve 110 associated with left front actuator 88. Similarly, for example, when left front actuator 88 is selected as the master actuator and right front actuator 134 is selected as the slave actuator, controller 70 may apply the first amount of current to control valve 110 associated with left front actuator 88 and the second amount of current to control valve 180 associated with right front actuator 134. Controller 70 may interact with one or more electrical power sources associated with machines 10 or 20 to apply the determined control parameters (e.g. amounts of current or amounts of voltage) as discussed above with respect to, for example, step 606 of method 600.

Figure 8A:
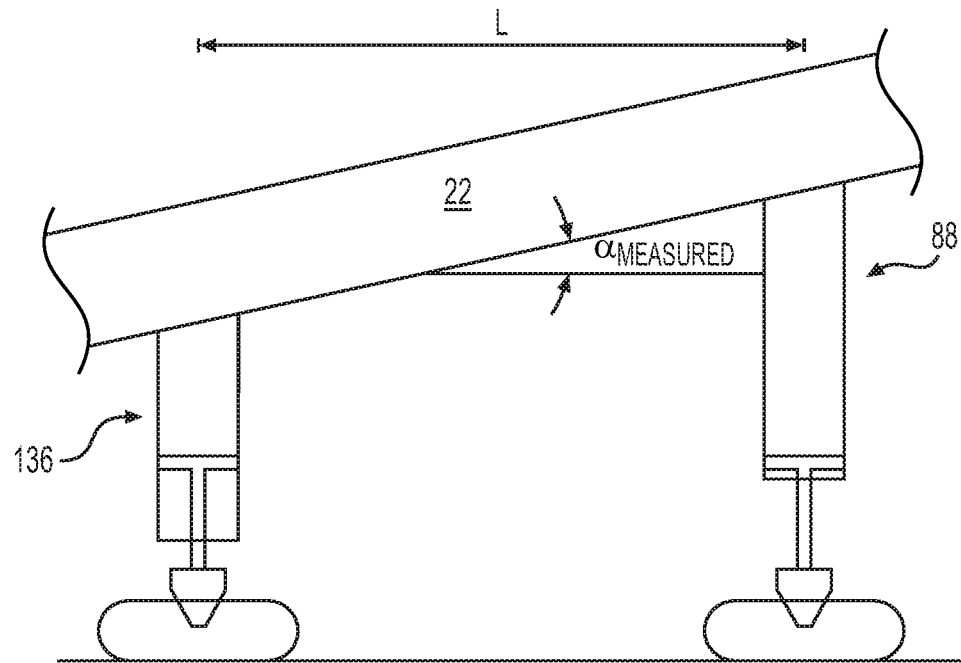
FIGS. 8A and 8B illustrate exemplary configurations of a frame of the machines of FIGS. 1 and 2 relative to a ground surface.
Figure 8B:
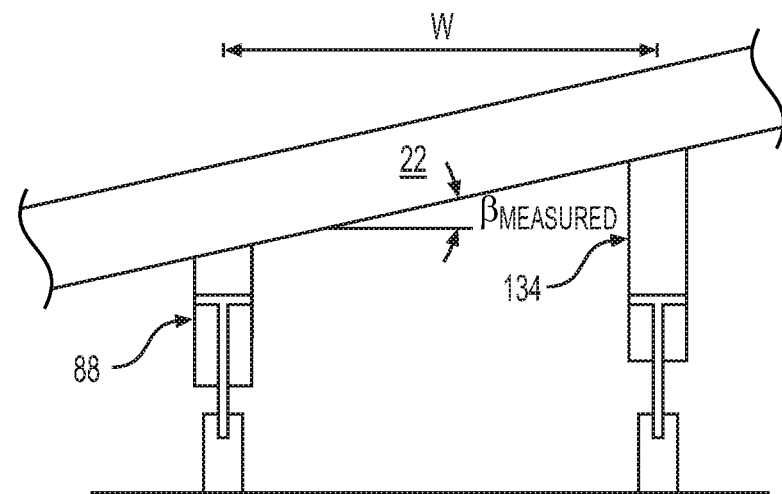

Method 700 may include a step of determining frame orientation (Step 710). In step 710, controller 70 may determine an orientation of frame 22 of machine 10 or 20, using signals generated by orientation sensor 68. For example, controller 70 may determine a pitch angle $\alpha_{measured}$ or roll angle $\beta_{measured}$ of frame 22 relative to a reference plane. In one exemplary embodiment the reference plane may be ground surface 44. FIGS. 8A and 8B illustrate exemplary configurations of frame 22 relative to ground surface 44 after operating master actuator and slave actuator for a predetermined time period Δt. For example, as illustrated in FIG. 8A, when rear actuator 136 and left front actuator 88 are master and slave cylinders, respectively, controller 70 may determine a pitch angle $\alpha_{measured}$ (e.g. slope relative to a length direction) of frame 22 relative to ground surface 44, using orientation sensor 68. As illustrated in FIG. 8B, when left front actuator 88 and right front actuator 134 are master and slave cylinders, respectively, controller may determine a roll angle $\beta_{measured}$ (e.g. slope relative to a width direction) of frame 22 relative to ground surface 44, using orientation sensor 68.

Returning to FIG. 7, method 700 may include a step of determining whether the determined frame orientation is different from a target orientation (Step 712). The target orientation may correspond to a target pitch angle $\alpha_{target}$ or target roll angle $\beta_{target}$ desired by an operator. For example, in one configuration, an operator may desire to raise or lower frame 22 generally parallel to ground surface 44. In this configuration, for example, the target pitch angle $\alpha_{target}$ or target roll angle $\beta_{target}$ would be about 0°. In another configuration for example, an operator may desire to raise or lower frame 22 so that frame 22 is tilted in a length direction by about 10° but remains generally parallel to the ground surface along the width direction. In this configuration, the target pitch angle $\alpha_{target}$ may be 10° and the target roll angle $\beta_{target}$ may be 0°. It will be understood that if the master and slave actuators do not extend or retract at their respective nominal actuator velocities, the pitch angle $\alpha_{measured}$ or roll angle $\beta_{measured}$ of frame 22 as determined by orientation sensor 68 may not match the target pitch angle $\alpha_{target}$ or target roll angle $\beta_{target}$.

In one exemplary embodiment, controller 70 may determine a slope error as an absolute value of a difference between the measured frame orientation and the target frame orientation. For example, controller 70 may determine the slope error using the expression $\|\alpha_{target}-\alpha_{measured}\|$ or $\|\beta_{target}-\beta_{measured}\|$ or using other mathematical expressions and/or algorithms. When controller 70 determines that the frame orientation (e.g. $\alpha_{measured}$ or $\beta_{measured}$) is different from the target orientation (e.g. $\alpha_{target}$ or $\beta_{target}$) (i.e. slope error is greater than a threshold slope error) (Step 712: YES), method 700 may proceed to step 714. When controller 70 determines, however, that the frame orientation is not different from the target orientation (i.e. slope error is less than or about equal to the threshold slope error) (Step 712: NO), method 700 may proceed to step 720 in which controller 70 may continue to operate the master and slave actuators by applying the first and second control parameters determined in, for example, step 706 to operate the master and slave actuators, respectively.

In step 714, controller 70 may determine a velocity error between actuator velocities of the master and slave actuators. In particular, controller 70 may determine the velocity error based on a difference between the frame orientation (e.g. slope error) determined, for example, in step 710 and the target orientation and the spacing between the master and slave actuators. For example, consider a configuration in which rear actuator 136 is the master actuator, left front actuator 88 is the slave actuator, and a target pitch angle $\alpha_{target}$ is 0°. As illustrated in FIG. 8A, after time period $\Delta t$, the pitch angle of frame 22 may be $\alpha_{measured}$, which may be different from 0°. In one exemplary embodiment as illustrated in FIG. 8A, controller 70 may determine a difference in the amounts of extension of rear actuator 136 and left front actuator 88 based on a simple trigonometric relationship. For example, the difference in the amounts of extension may be determined by the expression "L tan $\alpha$." Moreover, because this difference in the amounts of extension occurred over a period of time $\Delta t$, controller 70 may determine a velocity error $\Delta V$ (or relative velocity) between rear actuator 136 and left front actuator 88 by the expression "(L tan $\alpha$)/$\Delta t$." It is contemplated, however, that in other exemplary embodiments, controller 70 may determine the difference in the amounts of extension and the velocity error $\Delta V$ using other mathematical expressions, correlations, graphs, look-up tables, algorithms, etc.

By way of another example, consider a configuration in which left front actuator 88 is the master actuator, right front actuator 134 is the slave actuator, and a target roll angle $\beta_{target}$ is 0°. As illustrated in FIG. 8B, after time period $\Delta t$, the roll angle of frame 22 may be $\beta_{measured}$, which may be different from 0°. In one exemplary embodiment as illustrated in FIG. 8B, controller 70 may determine a difference in the amounts of extension of left front actuator 88 and right front actuator 134 based on a simple trigonometric relationship. For example, the difference in the amounts of extension may be determined by the expression "W tan $\beta$." Moreover, because this difference in the amounts of extension occurred over a period of time $\Delta t$, controller 70 may determine velocity error $\Delta V$ (or relative actuator velocity) between left front actuator 88 and right front actuator 134 by the expression "(W tan $\beta$)/$\Delta t$." It is contemplated, however, that in other exemplary embodiments, controller 70 may determine the difference in the amounts of extension and the velocity error using other mathematical expressions, correlations, graphs, look-up tables, algorithms, etc.

Returning to FIG. 7, method 700 may include a step of updating the second control parameter for the slave actuator (Step 714). Thus, for example, controller 70 may be configured to determine an updated second control parameter (e.g. updated second amount of current) for the slave actuator such that when the slave actuator is operated using the updated second control parameter, the pitch angle $\alpha_{measured}$ or roll angle $\beta_{measured}$ of frame 22 would match the target pitch angle $\alpha_{target}$ or target roll angle $\beta_{target}$, respectively. In one exemplary embodiment, controller 70 may rely on the relationship between actuator velocity and current (e.g. line 410 of FIG. 4) stored in memory device 72 to determine the updated second amount of current. For example, consider the configuration of FIG. 8A during a raise frame operation.

For example, consider the configuration illustrated in FIG. 8A. As illustrated in FIG. 8A, left front actuator 88 appears to have extended more than rear actuator 136, which may indicate that an actuator velocity of left front actuator 88 may be greater than that of rear actuator 136. In one exemplary embodiment, controller 70 may determine a change in the amount of current "$\Delta I$" required to reduce the actuator velocity of left front actuator 88 based on a relationship between the actuator velocity and current (e.g. FIG. 4) for left front actuator 88 stored in memory 72. In other exemplary embodiments, controller 70 may use correlations, graphs, look up table, algorithms, etc. to determine the change in the amount of current $\Delta I$ required to reduce the actuator velocity of left front actuator 88 by the velocity error 4V. It is also contemplated that in yet other exemplary embodiments, controller 70 may use a predetermined value $\Delta I$, which may be stored in memory device 72. Controller 70 may also determine the updated second amount of current for control valve 110 associated with left front actuator 88 by decreasing the second amount of current by $\Delta I$. In addition, controller 70 may update the actuator velocity to current relationship for the slave actuator (e.g. left front actuator 88) by storing the updated second amount of current in association with the nominal actuator velocity assigned to the slave actuator in memory 72.

Method 700 may include a step of operating the first actuator using the first control parameter and the second actuator using the updated second control parameter (Step 718). For example, with reference to the configuration of FIG. 8A, controller 70 may apply the first amount of current determined in, for example, step 706 to control valve 182 associated with the master actuator (e.g. rear actuator 136) and apply the updated second amount of current determined in, for example, step 716 to control valve 110 associated with the slave actuator (e.g. left front actuator 88).

The relative velocity based calibration of method 700 may help reduce the number of proximity sensors required for the machine. For example, one or more pairs of proximity sensors 112, 114, or 124, 126 and/or associated targets may be attached to a master actuator, for example, rear actuator 136. Controller 70 may be configured to perform method 600 to calibrate the relationship between actuator velocity and current for rear actuator 136 based on a distance between the pairs of proximity sensors. The remaining actuators 88, 134, and/or 192 may not be equipped with proximity sensors and/or targets. Controller 70 may still be able to calibrate the relationship between actuator velocity and current for actuators 88, 134, and/or 192 by performing method 700. For example, controller 70 may calibrate the relationship between actuator velocity and current for actuators 88 by designating rear actuator 136 as the master actuator and left front actuator 88 as the slave actuator while performing method 700. Subsequently, for example, controller 70 may calibrate the relationship between actuator velocity and current for actuator 134 by designating left front actuator 88 as the master actuator and right front actuator 134 as the slave actuator while performing method 700. Thus, method 700 may help reduce a cost of manufacturing and maintaining machine 10 or 20 by reducing a number of proximity sensors required for actuator velocity calibration.

It will be apparent to those skilled in the art that various modifications and variations can be made to the disclosed distance based actuator velocity calibration system. Other embodiments will be apparent to those skilled in the art from consideration of the specification and practice of the disclosed distance based actuator velocity calibration system. It is intended that the specification and examples be considered as exemplary only, with a true scope being indicated by the following claims and their equivalents.

What is claimed is:

1. A milling machine, comprising:
a frame;
a plurality of ground engaging tracks configured to support the frame;
an actuator connecting the frame to a track from the plurality of ground engaging tracks, the actuator being configured to adjust a height of the frame relative to a ground surface;
a control valve configured to selectively control a flow of fluid into or out of the actuator based on an amount of current supplied to the control valve; and
a controller configured to:
determine the amount of current required to extend or retract the actuator at a nominal actuator velocity;
apply the determined amount of current to the control valve;
determine a measured actuator velocity based on a time required to extend or retract the actuator by a predetermined length;
adjust the amount of current based on the measured actuator velocity and the nominal actuator velocity; and
apply the adjusted amount of current to the control valve to adjust the height of the frame relative to the ground surface,
wherein the controller is configured to adjust the amount of current such that the measured actuator velocity is about equal to the nominal actuator velocity.

2. The milling machine of claim 1, wherein the actuator includes:
a cylinder connected to the frame and containing fluid;
a piston slidably disposed within the cylinder; and
a rod having a first end connected to the piston, the rod extending from the piston to a second end connected to the track.

3. The milling machine of claim 2, further including:
a first proximity sensor positioned at a first distance from the frame; and
a second proximity sensor positioned at a second distance from the first proximity sensor.

4. The milling machine of claim 3, wherein the second distance is about equal to the predetermined length.

5. The milling machine of claim 3, wherein the controller is configured to:
receive a first signal from the first proximity sensor at a first time;
receive a second signal from the second proximity sensor a second time; and
determine the measured actuator velocity based on the second distance and an amount of time elapsed between the first time and the second time.

6. The milling machine of claim 3, wherein a position of the first proximity sensor corresponds to a scratch height for the milling machine.

7. The milling machine of claim 3, wherein a position of the second proximity sensor corresponds to a pre-service height of the milling machine.

8. The milling machine of claim 1, further including a memory configured to store data relating the amount of current and an actuator velocity, wherein the controller is configured to determine the amount of current based on the stored data.

9. The milling machine of claim 8, wherein the stored data includes at least one of a correlation, a lookup table, or an algorithm relating the amount of current and the actuator velocity.

10. The milling machine of claim 9, wherein the controller is configured to update the data stored in the memory by associating the adjusted amount of current with the nominal actuator velocity.

11. A method of operating an actuator including a cylinder containing a fluid, a piston slidably disposed within the cylinder, and a rod having a first end connected to the piston, and a control valve configured to selectively control a flow of the fluid into or out of the cylinder based on an amount of current supplied to the control valve, the method comprising:
determining, using a controller, the amount of current required to extend or retract the actuator at a nominal actuator velocity;
applying the determined amount of current to the control valve;
determining, using the controller, a measured actuator velocity based on a time required to extend or retract the actuator by a predetermined length;
adjusting, using the controller, the amount of current based on the nominal actuator velocity and the measured actuator velocity; and
applying, using the controller, the adjusted amount of current to the control valve to adjust a length of the actuator
wherein the actuator includes a first proximity sensor positioned at a first distance from one end of the cylinder and a second proximity sensor positioned at a second distance from the first proximity sensor, and wherein determining the measured actuator velocity includes
receiving, from the first proximity sensor a first signal at a first time;
receiving, from the second proximity sensor, a second signal at a second time;
determining, using the controller, the measured actuator velocity based on the second distance and an amount of time elapsed between the first time and the second time.

12. The method of claim 11, wherein the method further includes:
generating the first signal when the piston is positioned adjacent the first proximity sensor; and
generating the second signal when the piston is positioned adjacent the second proximity sensor.

13. The method of claim 11, further including adjusting the amount of current such that the measured actuator velocity is about equal to the nominal actuator velocity.

14. The method of claim 13, wherein adjusting the amount of current further includes:
changing the amount of current by a predetermined current;
applying the changed amount of current to the control valve;
determining, using the controller, the measured actuator velocity based on the time required to extend or retract the actuator by the predetermined length;
comparing the measured actuator velocity and the nominal actuator velocity; and
adjusting the predetermined current based on the a difference between the measured actuator velocity and the nominal actuator velocity.

15. A milling machine, comprising:

a frame;

a left front track disposed adjacent a front end of the frame;

a right front track disposed adjacent the front end and spaced apart from the left front track;

at least one rear track disposed adjacent a rear end of the frame;

a milling drum connected to the frame and disposed between the front end and the rear end;

an engine configured to rotate the milling drum and propel the left front track, the right front track, and the at least one rear track in a forward or rearward direction;

height adjustable leg columns connecting the frame to the left front track, the right front track, and the at least one rear track, each of the leg columns including:

an upper section connected to the frame;

a lower section slidably movable relative to the upper section and connected to one track of the left front track, the right front track, and the at least one rear track; and a height adjustable actuator connected at one end to the frame and at an opposite end to the one track;

a tank configured to store a fluid;

a conduit connecting the tank to the actuator;

a control valve configured to selectively control a flow of the fluid in the conduit between the tank and the actuator based on an amount of current supplied to the control valve;

a controller configured to:

determine the amount of current required to extend or retract the actuator at a nominal actuator velocity;

apply the determined amount of current to the control valve;

determine a measured actuator velocity based on a time required to extend or retract the actuator by a pre-determined length;

adjust the amount of current based on the measured actuator velocity and the nominal actuator velocity; and apply the adjusted amount of current to the control valve to adjust a height of the frame;

a first proximity sensor positioned on the upper section at a first height from the frame; and a second proximity sensor positioned on the upper section at a second height from the first proximity sensor, wherein each of the first and second proximity sensors are configured to generate a signal when an edge of the lower section is disposed adjacent a respective one of the first and second proximity sensors.

16. The milling machine of claim 15, wherein the height adjustable actuator includes:

a cylinder connected to the frame and containing the fluid;

a piston slidably disposed within the cylinder; and a rod having a first end connected to the piston, the rod extending from the piston to a second end connected to the one track.

\* \* \* \* \*